United States Patent
Adams et al.

(10) Patent No.: US 10,770,092 B1
(45) Date of Patent: Sep. 8, 2020

(54) VISEME DATA GENERATION

(71) Applicant: Amazon Technologies, Inc., Seattle, WA (US)

(72) Inventors: Zoe Adams, Orange County, CA (US); Pete Klein, Tustin, CA (US); Derick Deller, Capistrano Beach, CA (US); Bradley Michael Richards, Irvine, CA (US); Anirudh Ranganath, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

(21) Appl. No.: 15/712,734

(22) Filed: Sep. 22, 2017

(51) Int. Cl.
| | |
|---|---|
| *G10L 21/00* | (2013.01) |
| *G10L 21/06* | (2013.01) |
| *G10L 21/10* | (2013.01) |
| *G10L 21/18* | (2013.01) |
| *G10L 13/08* | (2013.01) |

(52) U.S. Cl.
CPC .............. *G10L 21/10* (2013.01); *G10L 13/08* (2013.01); *G10L 21/18* (2013.01); *G10L 2021/065* (2013.01); *G10L 2021/105* (2013.01)

(58) Field of Classification Search
CPC ......... G10L 13/08; G10L 15/02; G10L 15/04; G10L 15/30; G10L 15/22; G10L 15/08; G10L 21/00; G10L 19/00; G10L 19/008; G10L 2021/105; G10L 21/06; G06T 13/205
See application file for complete search history.

(56) References Cited

U.S. PATENT DOCUMENTS

| | | | | |
|---|---|---|---|---|
| 5,880,788 A * | 3/1999 | Bregler | ................. | G03B 31/02 |
| | | | | 345/473 |
| 6,012,961 A * | 1/2000 | Sharpe, III | ............... | A63H 3/28 |
| | | | | 446/175 |
| 6,317,716 B1 * | 11/2001 | Braida | ................. | G09B 21/009 |
| | | | | 704/270 |
| 6,369,821 B2 * | 4/2002 | Merrill | ..................... | G06F 8/00 |
| | | | | 345/473 |
| 6,539,354 B1 * | 3/2003 | Sutton | ..................... | G10L 21/06 |
| | | | | 345/423 |
| 6,654,018 B1 * | 11/2003 | Cosatto | ................... | G10L 13/08 |
| | | | | 345/473 |
| 6,919,892 B1 * | 7/2005 | Cheiky | ................... | G06T 13/40 |
| | | | | 345/473 |
| 9,056,396 B1 * | 6/2015 | Linnell | ................ | G05B 19/427 |
| 9,721,257 B2 * | 8/2017 | Navaratnam | .......... | B25J 11/001 |

(Continued)

OTHER PUBLICATIONS

King, Scott A., and Richard E. Parent. "Animating song." Computer Animation and Virtual Worlds 15.1 (2004): 53-61. (Year: 2004).*

*Primary Examiner* — Jialong He
(74) *Attorney, Agent, or Firm* — Lee & Hayes, P.C.

(57) ABSTRACT

Systems and methods for viseme data generation are disclosed. Uncompressed audio data is generated and/or utilized to determine the beats per minute of the audio data. Visemes are associated with the audio data utilizing a Viterbi algorithm and the beats per minute. A time-stamped list of viseme data is generated that associates the visemes with the portions of the audio data that they correspond to. An animatronic toy and/or an animation is caused to lip sync using the viseme data while audio corresponding to the audio data is output.

20 Claims, 11 Drawing Sheets

(56) References Cited

U.S. PATENT DOCUMENTS

| | | | | |
|---|---|---|---|---|
| 9,922,665 | B2* | 3/2018 | Matthews | G10L 21/10 |
| 9,934,785 | B1* | 4/2018 | Hulaud | G10L 15/22 |
| 10,127,908 | B1* | 11/2018 | Deller | G10L 15/22 |
| 2004/0056907 | A1* | 3/2004 | Sharma | G06K 9/00335 |
| | | | | 715/863 |
| 2004/0107106 | A1* | 6/2004 | Margaliot | G06T 13/00 |
| | | | | 704/270 |
| 2004/0120554 | A1* | 6/2004 | Lin | G06K 9/00335 |
| | | | | 382/118 |
| 2004/0220812 | A1* | 11/2004 | Bellomo | G10L 21/06 |
| | | | | 704/275 |
| 2006/0200355 | A1* | 9/2006 | Sideman | G10L 13/047 |
| | | | | 704/277 |
| 2007/0192095 | A1* | 8/2007 | Braho | G10L 15/01 |
| | | | | 704/232 |
| 2007/0220561 | A1* | 9/2007 | Girardeau, Jr. | H04N 21/2368 |
| | | | | 725/80 |
| 2008/0097754 | A1* | 4/2008 | Goto | G10L 15/26 |
| | | | | 704/214 |
| 2008/0126095 | A1* | 5/2008 | Sideman | G06F 3/167 |
| | | | | 704/260 |
| 2009/0069935 | A1* | 3/2009 | Wieland | A63G 7/00 |
| | | | | 700/245 |
| 2009/0288546 | A1* | 11/2009 | Takeda | G10L 25/48 |
| | | | | 84/612 |
| 2010/0063819 | A1* | 3/2010 | Emori | G10L 15/197 |
| | | | | 704/251 |
| 2010/0141662 | A1* | 6/2010 | Storey | G06T 13/40 |
| | | | | 345/473 |
| 2010/0179811 | A1* | 7/2010 | Gupta | G10L 15/22 |
| | | | | 704/235 |
| 2010/0211200 | A1* | 8/2010 | Kobayashi | G06T 13/205 |
| | | | | 700/94 |
| 2010/0227527 | A1* | 9/2010 | Smoot | A63F 7/0088 |
| | | | | 446/362 |
| 2011/0039506 | A1* | 2/2011 | Lindahl | G10L 19/20 |
| | | | | 455/130 |
| 2011/0131041 | A1* | 6/2011 | Cortez | G06T 13/205 |
| | | | | 704/235 |
| 2011/0246186 | A1* | 10/2011 | Takeda | G10H 1/0008 |
| | | | | 704/201 |
| 2012/0116766 | A1* | 5/2012 | Wasserblat | G10L 15/08 |
| | | | | 704/254 |
| 2013/0290818 | A1* | 10/2013 | Arrasvuori | H04N 21/4383 |
| | | | | 715/201 |
| 2014/0080606 | A1* | 3/2014 | Gillet | G10H 1/0008 |
| | | | | 463/35 |
| 2014/0260912 | A1* | 9/2014 | Maezawa | G10H 1/40 |
| | | | | 84/612 |
| 2014/0310764 | A1* | 10/2014 | Tippett | G06F 21/31 |
| | | | | 726/1 |
| 2014/0354787 | A1* | 12/2014 | Linnell | H04N 5/2224 |
| | | | | 348/61 |
| 2015/0195397 | A1* | 7/2015 | Rice | H04M 1/72527 |
| | | | | 345/619 |
| 2015/0199978 | A1* | 7/2015 | McCoy | G10L 21/10 |
| | | | | 704/270 |
| 2015/0371661 | A1* | 12/2015 | Chapman | A63F 13/12 |
| | | | | 704/270 |
| 2016/0012740 | A1* | 1/2016 | Arnold | G09B 5/12 |
| | | | | 434/350 |
| 2017/0011745 | A1* | 1/2017 | Navaratnam | G06F 17/30654 |
| 2017/0154457 | A1* | 6/2017 | Theobald | G06T 13/205 |
| 2017/0206697 | A1* | 7/2017 | McKenzie | G06T 13/80 |
| 2017/0256262 | A1* | 9/2017 | Ramachandra | G10L 15/265 |
| 2017/0287481 | A1* | 10/2017 | Bhat | G10L 15/04 |
| 2018/0139562 | A1* | 5/2018 | Eronen | H04S 7/30 |

* cited by examiner

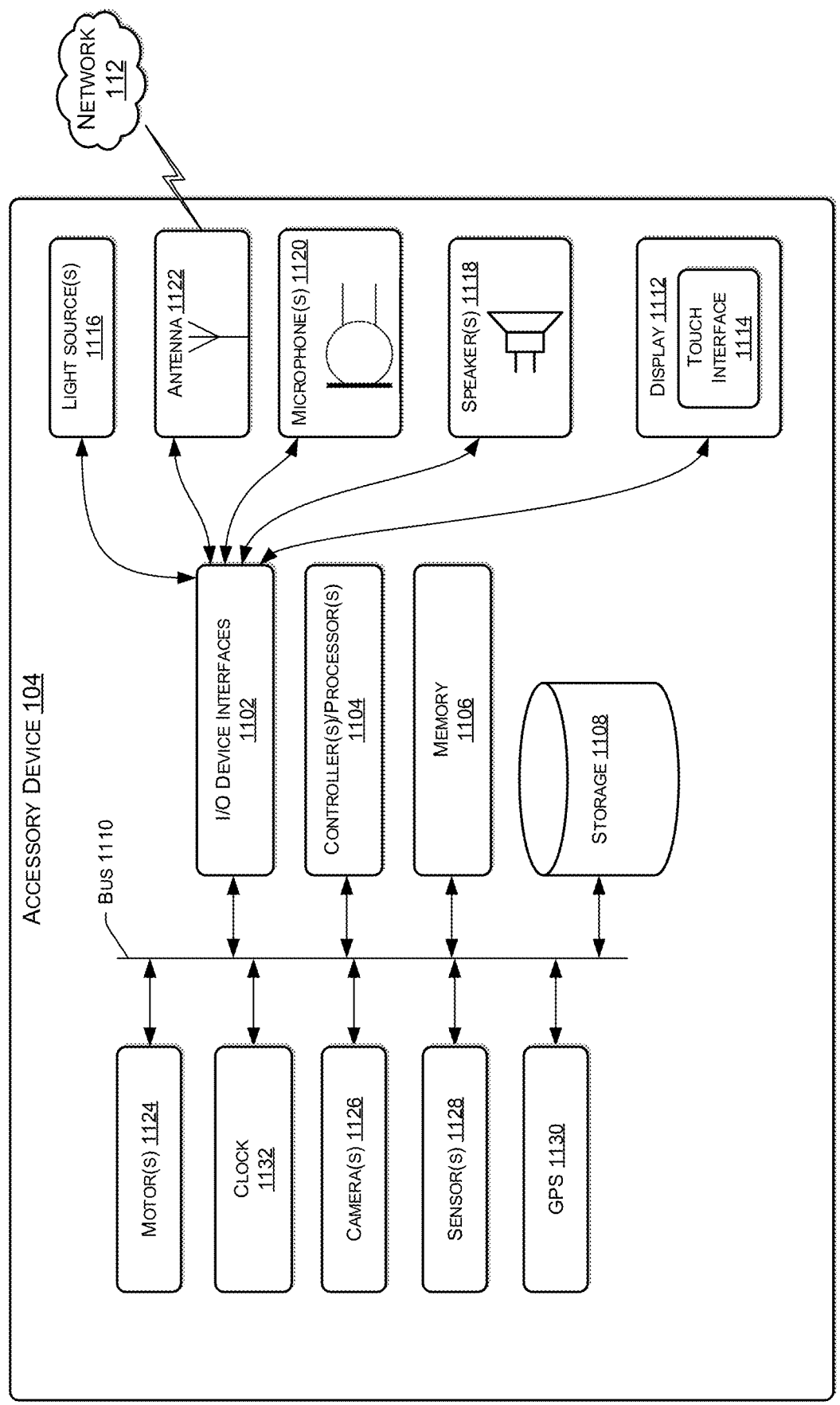

//(1)

VISEME DATA GENERATION

BACKGROUND

Audio may include non-speech components, such as sounds made by musical instruments, and speech components. Audio is generally output by one or more speakers. Described herein are improvements in technology that will help, among other things, to provide functionality in addition to audio output by speakers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 11 illustrates a conceptual diagram of example components of an accessory device to the voice-controlled device.

DETAILED DESCRIPTION

Figure 1:
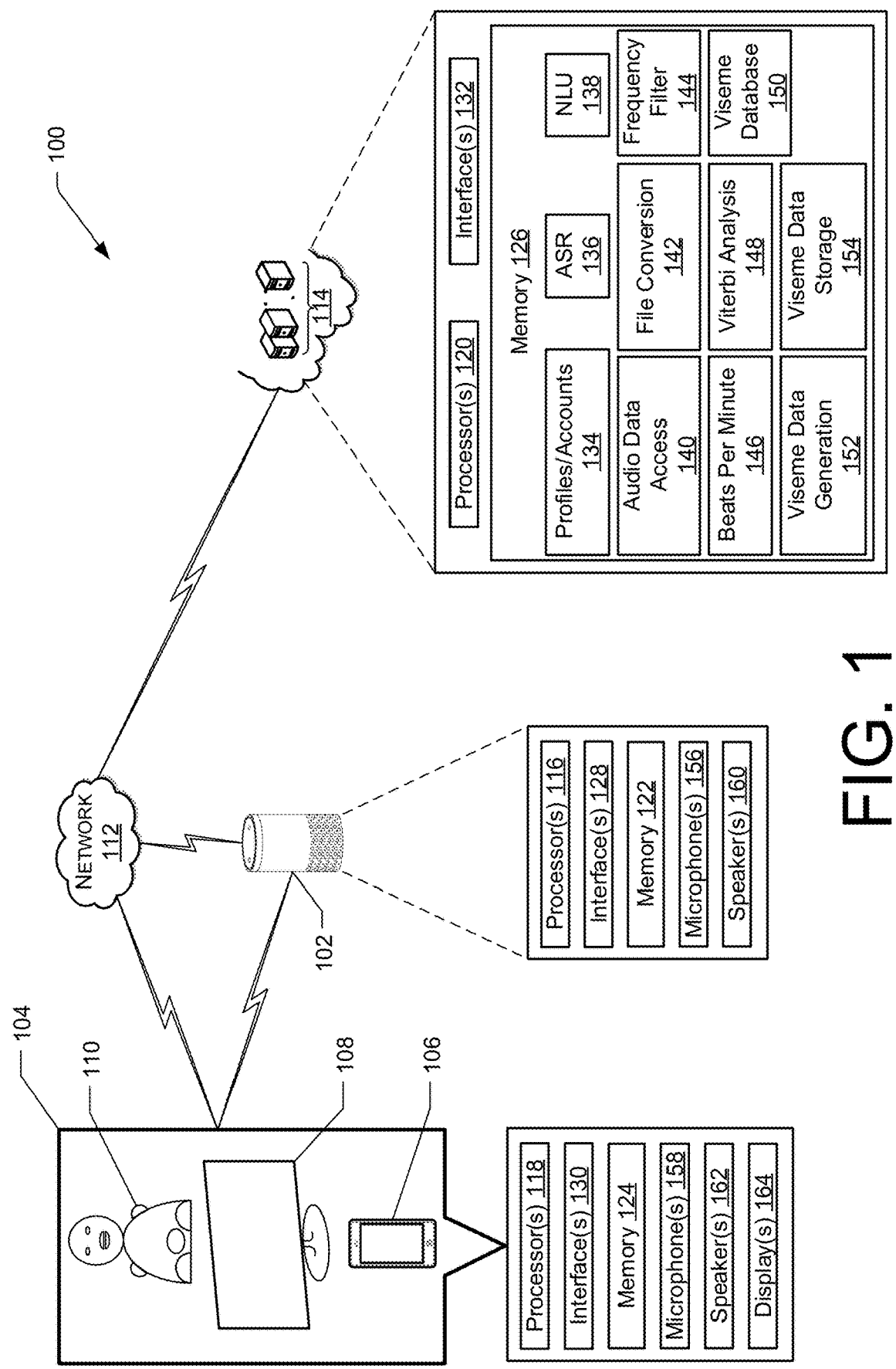
FIG. 1 illustrates a schematic diagram of an example environment for viseme data generation.

Systems and methods for viseme data generation and use (such as for a device "lip syncing" to music) are described herein. Take, for example, a person that desires to hear a song. That person may provide an indication of the song he or she desires to hear to a device, such as by speaking to a voice-controlled device. The person may also have a toy or animation (e.g. avatar, emoji, etc.) that can lip sync to the lyrics of the song. A request to output audio corresponding to the song and to cause the toy or animation to lip sync to the lyrics may be sent to a remote system, which may determine whether viseme data has been generated for the desired song. In instances where the viseme data has been generated, that viseme data may be sent to the user's device, which may cause the toy or animation to present mouth movements, described herein as visemes, that correspond to the lyrics of the song.

In instances where the viseme data has not been generated, a process of generating the viseme data may be initiated. The viseme data generation process may include receiving a file corresponding to the song. The file may be in a compressed file format, such as *.MP3 or *.AAC, for example. The remote system may generate audio data corresponding to the song in an uncompressed format, such as, for example, *.WAV. The *.WAV audio data may represent the song in terms of audio frequencies and acoustic energies, such as amplitudes. The audio data may then be analyzed to determine a number of beats per minute (BPM) of the song. For example, the desired song may have a BPM of approximately 120 BPM. This information may be stored in a database for use by the remote system. Additionally, or alternatively, a frequency filter may be applied to the audio data to identify portions of the audio data that do not include audio frequencies in the human sound range. These identified portions will not contain lyrics and therefore will not be associated with viseme data and need not be analyzed in subsequent operations.

The remaining portions of the audio data may be analyzed using a Viterbi algorithm to determine which components of the audio data correspond at least in part to lyrics. The Viterbi algorithm and/or its input values may be modified based at least in part on the BPM data associated with the song. In these examples, the BPM data may provide an indication of which portions of the audio data correspond to sounds from instruments that play notes with the beat of the song and/or multipliers or fractions of the beat. The Viterbi algorithm may also be utilized to determine which portions of the audio data correspond to high variance frequencies and/or which portions of the audio data correspond to low variance frequencies. Portions that correspond to high variance frequencies are likely to be associated with lyrics, while low variance frequencies are more likely to correspond to musical instrument sounds. The Viterbi algorithm may be applied several times, in some examples with modifications to the algorithm and/or input values over time, until a confidence level that the lyrics of the song have been identified reaches at least a threshold confidence level. By utilizing the Viterbi algorithm as described herein, metadata indicating the lyrics of the song is not needed to determine the portions of the song that correspond at least in part to human sound.

One or more visemes may then be associated with the portions of the audio data that correspond at least in part to lyrics. A determination of which viseme of multiple visemes to associate with a given portion of the audio data may be made based at least in part on the acoustic energy and/or amplitude associated with the portion of the audio data. For example, a high acoustic energy may correspond to the middle of a word and/or phrase of the lyrics and/or to a word or phrase in which the mouth is more open as compared to other words or phrases. One or more visemes corresponding to an open mouth position may be associated with these portions of the audio data. By way of further example, a low acoustic energy may correspond to the beginning and/or ending of a word and/or phrase of the lyrics and/or to a word or phrase in which the mouth is only slightly open. One or more visemes corresponding to a slightly open mouth position may be associated with these portions of the audio data. Additionally, in examples, an acoustic energy between the high acoustic energy and the low acoustic energy, as described above, may correspond to a word or phrase that is less prominent in the song and/or is sung with less emphasis than other words or phrases of the song. One or more visemes corresponding to a partially open mouth position may be associated with these portions of the audio data.

Once the visemes to be associated with the audio data are determined, lip-sync data may be generated that associates the visemes with the portions of the audio data where lip syncing will occur. As described herein, lip-sync data may include audio data and viseme data. The viseme data may include an identification of the visemes and timing data that may indicate the times at which lip syncing using the visemes will occur. The viseme data, for example, may represent a time-stamped list of the determined visemes. This viseme data may be stored in a database along with an indication that the viseme data corresponds to the song. Once generated, the viseme data may be accessed and sent to user devices when lip syncing is requested or determined to be necessary or desired.

The system described herein may provide additional, or alternative, functionalities, such as, for example, utilizing contextual information, such as the artist of the song and/or the genre of the song, to inform the determination of which portions of the song correspond to lyrics. The functionalities may additionally, or alternatively, include causing an accessory device that includes a screen to display an animation of a face with a mouth that moves during the lip syncing. The functionalities may additionally, or alternatively, include sending the viseme data to a user device when the user device is in wired or wireless communication with an accessory device that is configured to present visemes. The functionalities may additionally, or alternatively, include generating audible responses to user queries and generating viseme data that corresponds to the words and/or phrases of the audible responses. The functionalities may additionally, or alternatively, include performing automatic speech recognition on audio data to generate text data corresponding, for example, to the lyrics of a song. The text data may be utilized to more accurately associate the visemes with the lyrics. The functionalities may additionally, or alternatively, include receiving accuracy feedback information from user devices and/or users and altering the determination of BPMs, and/or lyrical portions of the audio data based at least in part on the feedback information. The functionalities may additionally, or alternatively, include determining, such as via user profile data, that a user of a device is hearing impaired and sending the viseme data to the device based at least in part on determining that the user is hearing impaired. The functionalities may additionally, or alternatively, include utilizing the BPM data to cause a visual indicator, such as one or more lights, to visually present the beat of the song.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for viseme data generation. System 100 may include a user device 102, which, in some examples, may be a voice-controlled device, one or more accessory devices 104, such as a mobile device 106, a television 108, and/or an animatronic toy 110. The user device 102 may be in direct wired and/or wireless communication with the one or more accessory devices 104, and/or the user device 102 may be in communication with the one or more accessory devices 104 via a network 112. The user device 102 and/or the one or more accessory devices 104 may additionally, or alternatively, be in communication with a remote system 114, such as via the network 112.

The user device 102, the one or more accessory devices 104, and/or a remote system 114 may include one or more processors. As used herein, a processor, such as processor(s) 116, 118, and/or 120, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 116, 118, and/or 120 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 116, 118, and/or 120 may possess its own local memory, which also may store program components, program data, and/or one or more operating systems.

The user device 102, the one or more accessory devices 104, and/or the remote system 114 may also include memory 122, 124, and/or 126. Memory 122, 124, and/or 126 may include volatile and nonvolatile memory, removable and non-removable media implemented in any method or technology for storage of information, such as computer-readable instructions, data structures, program component, or other data. Such memory 122, 124, and/or 126 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 122, 124, and/or 126 may be implemented as computer-readable storage media ("CRSM"), which may be any available physical media accessible by the processor(s) 116, 118, and/or 120 to execute instructions stored on the memory 122, 124, and/or 126. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 122, 124, and/or 126, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Additionally, the user device 102, the one or more accessory devices 104, and/or the remote system 114 may include one or more network interface(s) 128, 130, and/or 132, which may enable communications between the components and/or devices shown in system 100 and/or with one or more remote systems, as well as other networked devices. Such network interface(s) 128, 130, and/or 132 can include one or more network interface controllers (NICs) or other types of transceiver devices to send and receive communications over a network 112.

For instance, each of the network interface(s) 128, 130, and/or 132 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 128, 130, and/or 132 may include a wide area network (WAN) component to enable communication over a wide area network.

In some instances, the remote system 114 may be local to an environment associated the user device 102 and/or the one or more accessory devices 104. For instance, the remote system 114 may be located within the user device 102 and/or the one or more accessory devices 104. In some instances, some or all of the functionality of the remote system 114 may be performed by one or more of the user device 102 and/or the one or more accessory devices 104.

The memory 126 of the remote system 114 may include computer-executable instructions, described below as components of the memory 126, that when executed by the one or more processors 120 may cause the one or more processors 120 to perform various operations. Exemplary components of the memory 126 of the remote system 114 may include a profile/accounts component 134, an automatic speech recognition (ASR) component 136, a natural language understanding (NLU) component 138, an audio data access component 140, a file conversion component 142, a frequency filter component 144, a beats per minute (BPM) component 146, a Viterbi analysis component 148, a viseme database 150, a viseme data generation component 152, and/or a viseme data storage component 154. Each of these exemplary components of the memory 126 are described below.

Figure 8:
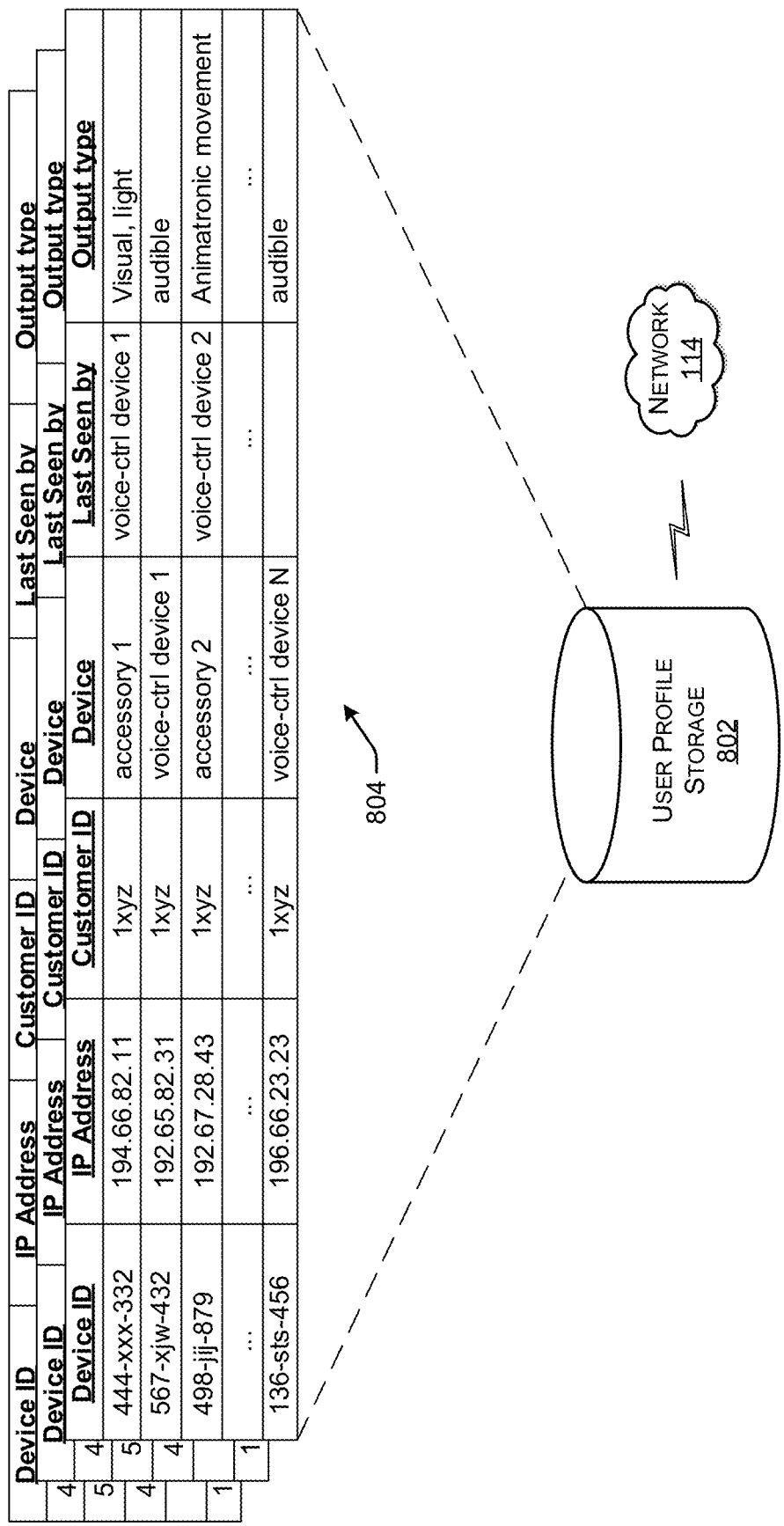
FIG. 8 illustrates a user profile storage that includes data regarding user profiles.

The profiles/accounts component 134, described in more detail with respect to FIG. 8, may include one or more databases that store user profile and/or user account information. The user profile and/or user account information may include one or more associations between one or more users of one or more devices, such as the user device 102 and/or the one or more accessory device 104. The user profile and/or user account information may include device usage information, access rights information, contextual information about users, devices, and/or environments in which the users and/or the devices are located in. The contextual information may additionally, or alternatively, include information associated with audio data, such as, in the example of music, an artist associated with a song and/or a genre associated with a song.

Figure 7:
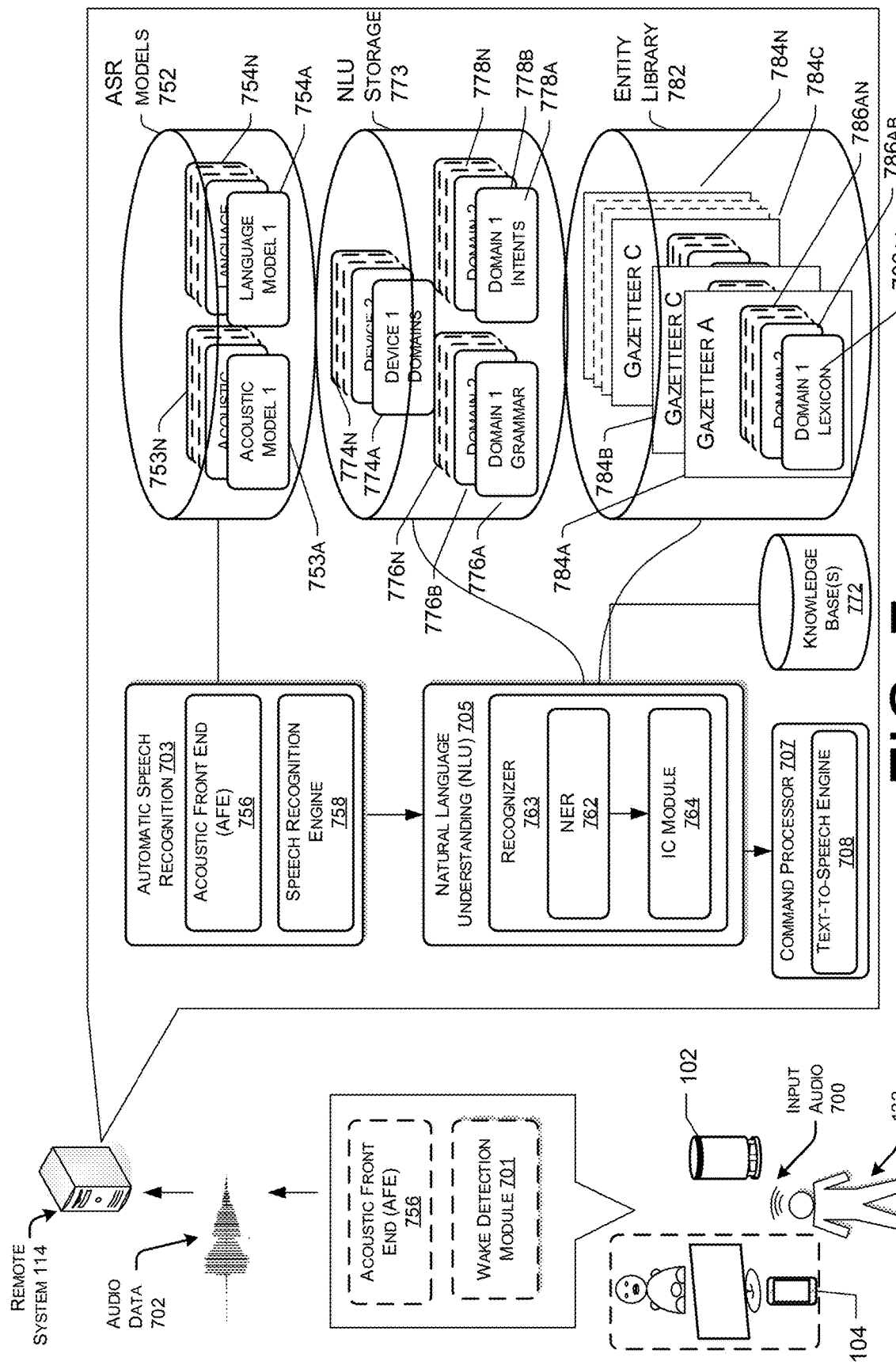
FIG. 7 illustrates a conceptual diagram of components of a speech processing system for processing audio data provided by one or more devices.

The ASR component 136, described in more detail with respect to FIG. 7, may be utilized to generate text data from audio data. For example, when audio data is received by the remote system 114, the ASR component 136 may perform automatic speech recognition on the audio data to generate text data comprising one or more words and/or phrases corresponding to the portion of the audio data representing human sound. The NLU component 138, also described in more detail with respect to FIG. 7, may utilize the text data from the ASR component 136 to determine one or more intents associated with the human sound. For example, a user may give a command to the user device 102, such as "Alexa, play You're Welcome by Dwayne Johnson." One or more microphones 156 of the user device 102 and/or one or more microphones 158 of the one or more accessory devices 104 may capture the audio corresponding to this command and may generate corresponding audio data. The audio data may be sent to and received by the remote system 114. The ASR component 136 may generate the text data corresponding to the words of the command, and the NLU component 138 may determine that the intent of the command is to output audio corresponding to the song "You're Welcome" by the artist "Dwayne Johnson," in this example.

The audio data access component 140 of the remote system 114 may access the requested song. Accessing the song, or other audio data, may include accessing a database of the remote system 114 where audio data corresponding to the song is stored. Accessing the song may additionally, or alternatively, include causing a streaming audio service to send the audio data from the streaming service to the remote system 114 and/or the user device 102 with or without making a copy of the audio data. In examples, the audio data may be stored and/or accessed in a compressed format, such as *.MP3 and/or *.AAC. For example, *.MP3 audio data may be associated with audio data that has been downloaded and saved to a database, while *.AAC audio data may be associated with audio data from a streaming service. The file conversion component 142 may convert the compressed format audio data to an uncompressed format, such as *.WAV. The uncompressed format may represent the audio data in terms of audio frequencies and acoustic energies, which may correspond to amplitudes.

The uncompressed audio data may then be analyzed by the frequency filter component 144. The frequency filter component 144 may be configured to determine portions of the audio data that do not include frequencies in the human sound range. For example, audio frequencies of human sound may range from approximately 20 hertz (hz) to approximately 120 hz. Portions of the audio data that do not include audio frequencies within this range likely do not contain human sound, and therefore would not correspond to a portion of the audio data to which lip syncing would be applied. The portions of the audio data that do not include audio frequencies in the range described above would not undergo further analysis for generation of viseme data. It should be understood that the range of audio frequencies corresponding to human sound provided above is by way of illustration only. Other audio frequency ranges may be used instead of or in addition to the range provided herein. For example, contextual information related to the audio data may inform the audio frequency range that the frequency filter component 144 may utilize. The contextual information may be, for example, an artist associated with a song and/or a genre associated with a song. This contextual information may indicate a different audio frequency range that human sound is produced at, and that alternatively audio frequency range may be utilized by the frequency filter component 144. It should also be understood that while this component of the memory 126 is described as a "filter," the frequency filter component 144 may not actually filter out portions of the audio data that do not correspond to human sound frequencies. Instead, the frequency filter component 144 may identify the portions of the audio data that do not correspond to human sound and may mark or otherwise cause these portions to not undergo further analysis for the purpose of generating viseme data.

The remaining portions of the audio data, which are the portions that include human sound, may undergo an analysis of the BPM associated with the audio data. The BPM component 146 may analyze the audio frequencies of the audio data and the acoustic energies of the audio data to determine which portions of the audio data correspond to recurring frequencies and acoustic energies. For example, portions of the audio data corresponding to sounds produced by percussion instruments may have recurring frequencies and/or acoustic energies throughout the song or portions thereof. Sounds produced by other instruments, such as bass guitars, may also have recurring frequencies and/or acoustic energies throughout the song. These recurring frequencies and/or acoustic energies may be identified as beats, and a number of these recurring frequencies and/or acoustic energies may be measured in a given span of time, such as a second, or in a measure, and converted to beats per minute. The BPM analysis may be performed utilizing a sampling of the audio data at given intervals, such as, for example, every second or every two seconds, and the results may be smoothed over the course of the audio data. It should be understood that while the unit of measure used herein for the recurrence of the beat of a song is provided as BPM, it should be understood that other units of measure may be used, such as beats per measure, beats per second, or other similar units. The BPM data generated by the BPM component 146 may be stored, such as in the memory 126 of the remote system 114. Additionally, in examples, contextual information, as described above, may be utilized to inform the determination of the BPM. For example, if BPM data is known for a given artist and that BPM data is consistent or relatively consistent, determination of the BPM for a given song by that artist may be biased toward the known BPM data.

The audio data may then be analyzed by the Viterbi analysis component 148. The Viterbi analysis component 148 may utilize a Viterbi algorithm to determine, at a given point in the audio data, what the most likely next audio frequency and/or acoustic energy will be. In so doing, the Viterbi algorithm may be utilized to determine where variances in audio frequencies and acoustic energies of the audio data are located in the audio data. The Viterbi analysis component 148 may utilize the BPM data determined above to identify a sample size of the audio data for analysis. The Viterbi analysis component 148 utilizes the Viterbi algorithm to determine variances in the audio frequencies and acoustic energies of the audio data. Portions of the audio data that correspond to high audio frequency variances and/or high acoustic energy variances are more likely to include human sound, while portions of the audio data that correspond to low audio frequency variances and/or low acoustic energy variances are more likely to not include human sound.

The Viterbi analysis component 148 may analyze the audio data multiple times to more accurately determine the portions of the audio data that correspond to human sound. In examples, the input information for the Viterbi algorithm may be modified with some or each iteration of the Viterbi algorithm. For example, for the initial iteration of the Viterbi algorithm, the array of initial probabilities and sequence of observations may be set to default values and/or may be set based at least in part on the BPM data and/or contextual information associated with the audio data. However, with each iteration of the Viterbi algorithm a hidden state sequence is output, and that hidden state sequence may be utilized to adjust the input probabilities and sequence of observations for the next iteration of the Viterbi algorithm. In examples, this process may be repeated over and over until a threshold confidence level is reached. For example, the Viterbi algorithm may be applied to the audio data until an output variance of the Viterbi algorithm reaches a threshold variance with respect to output of the previous iteration of the Viterbi algorithm. The result of the Viterbi analysis component 148 may include data indicating at which points of the audio data human sound starts and stops. These portions of the audio data may be utilized in the following operations to generate viseme data.

The memory 126 of the remote system 114 may also include a viseme database 150. The viseme database 150 may include a list of visemes and/or instructions that, when executed by a processor, cause a device having and/or depicting a mouth to move to a mouth position corresponding to the visemes. A viseme, as described herein, is used to describe the position of a mouth when making a certain sound. For example, when a person is not speaking, a viseme associated with this state may be a closed or at rest mouth position. By way of further example, when a person says the word "puppy," one or more visemes may be associated with the mouth positions of a person saying this word. For example, the mouth position for saying the "p" in "puppy" generally corresponds to the lips being mostly closed and at least slightly parsed; the next mouth position for saying the "u" in "puppy" generally correspond to the mouth being open and relaxed; the next mouth position for saying the "pp" in "puppy" generally corresponds to the same or a similar viseme as the first "p" in "puppy"; and the final mouth position for saying the "y" in "puppy" generally corresponds to the mouth being open and the bottom lip being extended further away from the face than the upper lip. It should be understood that the description of some visemes as described with respect to this example are merely exemplary and other additional visemes are known. For example, sound corresponding to a person yelling or speaking loudly may be associated with mouth positions that are more open.

Data corresponding to these visemes along with instructions to cause a device with a mouth and/or depicting a mouth to form mouth positions that correspond to these visemes may be stored in the viseme database 150. Additionally, in examples, the visemes may be grouped or otherwise categorized. For example, the visemes may be categorized into four categories of mouth positions: (1) closed or mostly closed; (2) slightly open; (3) completely or mostly open; and (4) moderately open, which may be a position between slightly open and completely open. A representative viseme for each of these categories may be identified and used for viseme data generation.

Once the portions of the audio data corresponding at least in part to human sound are determined, such as via the frequency filter component 144 and/or Viterbi analysis component 148, viseme data may be generated utilizing the viseme data generation component 152. The viseme data generation component 152 may associate visemes, such as those stored in the viseme database 150, with portions of the audio data that correspond to human sound. The viseme data generation component 152 may analyze the acoustic energy levels associated with the audio data. For example, using the categories of visemes described above, for portions of the audio data that do not correspond to human sound, the closed or mostly closed viseme may be utilized or no viseme may be associated with these portions of the audio data. In examples where no viseme is associated with portions of the audio data that do not include human sound, the device presenting the visemes may have a default of a closed mouth position.

By way of further example, when the acoustic energy level associated with the human sound is within a given acoustic energy level range, a corresponding viseme may be associated with that portion of the audio data. For example, if acoustic energy is associated with a 1 to 12 scale, different ranges of the scale may be associated with different viseme categories. For example, acoustic energy levels of 1-3 may be associated with the closed or mostly closed viseme, acoustic energy levels of 4-6 may be associated with the slightly open viseme, acoustic energy levels of 7-9 may be associated with the moderately open viseme, and acoustic energy levels of 10-12 may be associated with the completely or mostly open viseme. It should be understood that the acoustic energy level scale provided herein is by way of illustration only and not by way of limitation.

Other scales and units may be utilized to categorize acoustic energy levels and associate those energy levels with visemes, such as, for example, decibels. It should also be understood that while the acoustic energy level ranges described here are static and have similar ranges, in other examples, the ranges may be dynamic such that one or more of the ranges change over time, such as in response to feedback on the accuracy of viseme association with audio data. Additionally, or alternatively, one acoustic energy level range may have a smaller range than another range. Using the example above to illustrate, a first acoustic energy level range may be 1-2 while a second acoustic energy level range may be 3-7, for example. In other examples, associating visemes with portions of the audio data may be performed randomly such that one or more visemes are associated with the audio data without regard to the acoustic energy levels of the audio data.

The viseme data generation component 152 may generate viseme data, also described herein as viseme data, that correlates a timing component of the audio data with at least one of the visemes from the viseme database 150. In examples, the viseme data may include a time-stamped list of visemes and may include instructions that, when executed by a processor of a device presenting the visemes, may cause presentation of the identified visemes at the times indicated by the viseme data. The viseme data may be generated in a *.JSON format. The viseme data may be stored in a database, such as the viseme data storage component 154 of the memory 126. The viseme data may be accessed by the remote system 114, the user device 102, the one or more accessory device 104, and/or other devices, such as devices associated with different user profiles and/or user accounts to cause the user device 102, the one or more accessory devices 104, and/or the other devices to present visemes associated with the audio data. In examples, the operations, or a portion thereof, associated with generating viseme data may not be performed based at least in part on the viseme data being stored in the viseme data storage component 154.

Based at least in part on receiving a request to output audio corresponding to the audio data, and, for example, to present the visemes, the remote system 114 may send or cause another system to send the audio data to the user device 102 and/or the one or more accessory devices 104. The user device 102 may output the corresponding audio via one or more speakers 160. Additionally, or alternatively, the one or more accessory devices 104 may output the audio via one or more speakers 162. In examples, the one or more accessory devices 104 may include one or more displays 164. In these examples, the one or more displays 164 may be utilized to present the visemes, such as through an animation of a mouth. The one or more displays 164 may additionally, or alternatively, be utilized to present a visual indication of the non-speech portions of the audio data, such as sounds made by musical instruments. Additionally, or alternatively, text corresponding to the lyrics of the song may be displayed on the one or more displays 164.

The viseme data described herein, as well as the request for such data and/or configuration data indicating the ability for a device to present visemes may be sent and received in multiple ways. For example, the request for viseme data and/or the configuration data may be sent from the one or more accessory device 104 to the remote system 114 through the network 112. In other examples, the request for viseme data and/or the configuration data may be sent from the user device 102 to the remote system 114 through the network 112. The viseme data may be sent from the remote system 114 to the user device 102 through the network 112, and in these examples, the user device 102 may send the viseme data to the one or more accessory devices 104, or the user device 102 may send instructions to present visemes to the one or more accessory device 104 without sending the viseme data received from the remote system 114. Communication between the user device 102 and the one or more accessory devices 104 may be via the network 112, and/or the user device 102 may communicate with the one or more accessory devices 104 using Bluetooth.

In examples, synchronization of audio output and presentation of visemes may be performed. For example, it may be desirable to present the visemes along with output of the audio with the viseme presentation timed to match or substantially match the human sound portions of the audio to which the visemes correspond. Instructions may be sent from the user device 102 to the one or more accessory devices 104 to cause a movable mouth of the one or more accessory devices 104 to operate in coordination with words in the song, as the words are output via the speaker(s) of the user device 102. Additionally, or alternatively, the instructions may cause presentation of mouth-related animations on a display of the accessory device 104 in coordination with the words in the song, as the words are output via the speaker(s) of the user device 102. Thus, the accessory device 104 can begin processing the control information at the time specified in the instruction to synchronize mouth movements (either via a movable member or via digitized animations on a display) with the words in the audio content, as the audio content is output via the user device 102. In order to synchronize local clocks on the respective devices, the user device 102 may send time synchronization information to the accessory device 104 to ensure that the processing of the control information begins at approximately the same time as the output of the main content via the user device 102.

FIG. 2A illustrates an example device 200 that may utilize viseme data to present visemes, such as a first viseme. The device 200 may be the same as or similar to the one or more accessory devices 104 from FIG. 1. The device 200 may include a number of components, including a mouth portion 202(*a*). At least the mouth portion 202(*a*) may be animatronic or otherwise configured to move. The device 200 may additionally include one or more processors and computer-readable media storing instructions that, when executed by the one or more processors, may cause the one or more processors to perform several operations. Those operations may include receiving viseme data, as described above, from a remote system such as remote system 114 and/or from the user device 102 from FIG. 1. The operations may additionally include causing at least a portion of the mouth portion 202(*a*) of the device 200 to move based at least in part on the viseme data, such as via one or more motors. In examples, the device 200 is an animatronic toy and may include components in addition to the mouth portion 202(*a*) to fulfill aesthetic or other functional aspects of the device 200. For example, as shown in FIG. 2A, the device 200 may resemble a doll and may have a head portion and a body portion.

The device 200 may additionally, or alternatively, include a light element 204(*a*), which may include one or more lights, such as, for example, light emitting diodes (LEDs). The computer-readable media of the device 200 may cause the one or more processors of the device 200 to activate and deactivate the lighting element 204(*a*) or portions thereof to provide a visual display of the audio data. For example, the lighting element 204(*a*) may be activated and deactivated with the beat of the audio data, such as when the audio data corresponds to a song. In other words, lights of the lighting element 204(*a*) may turn on when certain sounds from the song are output by the speakers of the device 200 or speakers of another device. Additionally, or alternatively, an intensity of the lights may vary with the sounds emitted from the speakers. For example, the intensity of the lights may increase when the acoustic energy level of the audio data increases, while the intensity of the lights may decrease when the acoustic energy level of the audio data decreases. Additionally, or alternatively, the number of lights of the lighting element 204(*a*) that are activated may be based at least in part on the acoustic energy level.

Additionally, or alternatively, the device 200 may include one or more appendages 206(*a*). The computer-readable media may cause the processors of the device 200 to move the appendages 206(*a*) based at least in part on the BPM data or other data associated with the audio data. In this way, the device 200 may be caused to dance or otherwise move to the beat of the song. It should be understood that while the appendages 206(*a*) of the device 200 are shown in FIG. 2A has resembling arms and legs, the appendages 206(*a*) may include either arms or legs or may include appendages other than arms and/or legs. In examples, the body portion of the device 200 or features of the head component, such as eyes, eye lids, cheeks, ears, and/or eye brows may be caused to move to the beat of the song.

As shown in FIG. 2A, the mouth portion 202(*a*) is positioned with respect to a first viseme, which may correspond to a slightly open mouth. As noted above, this viseme may correspond to an acoustic energy level within a first, low acoustic energy level range.

FIG. 2B illustrates the example device 200 presenting a second viseme. The device 200 may include the same or similar components from FIG. 2A, such as a mouth portion 202(*b*), a lighting element 204(*b*), and appendages 206(*b*). The mouth portion 202(*b*), lighting element 204(*b*), and appendages 206(*b*) may operate in the same or a similar manner to the mouth portion 202(*a*), lighting element 204 (*a*), and appendages 206(*a*) from FIG. 2A. As shown in FIG. 2B, the mouth portion 202(*b*) is positioned with respect to a second viseme, which may correspond to a moderately open mouth. As noted above, this viseme may correspond to an acoustic energy level within a second acoustic energy level range. The second acoustic energy level range may be greater than the first acoustic energy level range, as described with respect to FIG. 2A.

FIG. 2C illustrates the example device 200 presenting a third viseme. The device 200 may include the same or similar components from FIG. 2A, such as a mouth portion 202(*c*), a lighting element 204(*c*), and appendages 206(*c*). The mouth portion 202(*c*), lighting element 204(*c*), and appendages 206(*c*) may operate in the same or a similar manner to the mouth portion 202(*a*) and the lighting element 204(*a*) from FIG. 2A. As shown in FIG. 2C, the mouth portion 202(*c*) is positioned with respect to a third viseme, which may correspond to a completely open or mostly open mouth. As noted above, this viseme may correspond to an acoustic energy level within a third acoustic energy level range. The third acoustic energy level range may be greater than the first acoustic energy level range and the second acoustic energy level range, as described with respect to FIGS. 2A and 2B.

FIG. 2D illustrates an example device 200 including a display depicting a digital rendering to present visemes. The digital rendering may depict the same or similar components from FIG. 2A, such as a mouth portion, a lighting element, and/or appendages. The rendering may provide a visual indication to a user of the device 200 that the components of the digital rendering are operating in a similar manner to the physical components of the device 200 from, for example, FIG. 2A. In some examples, more than one digital rendering may be presented, such as when multiple sets of viseme data are generated and/or utilized and/or when the viseme data includes identifiers that are configured to identify which rendering will execute visual representations of a given portion of the viseme data.

FIGS. 3-6 illustrate various processes for generating viseme data. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 7-11, although the processes may be implemented in a wide variety of other environments, architectures and systems.

Figure 3:
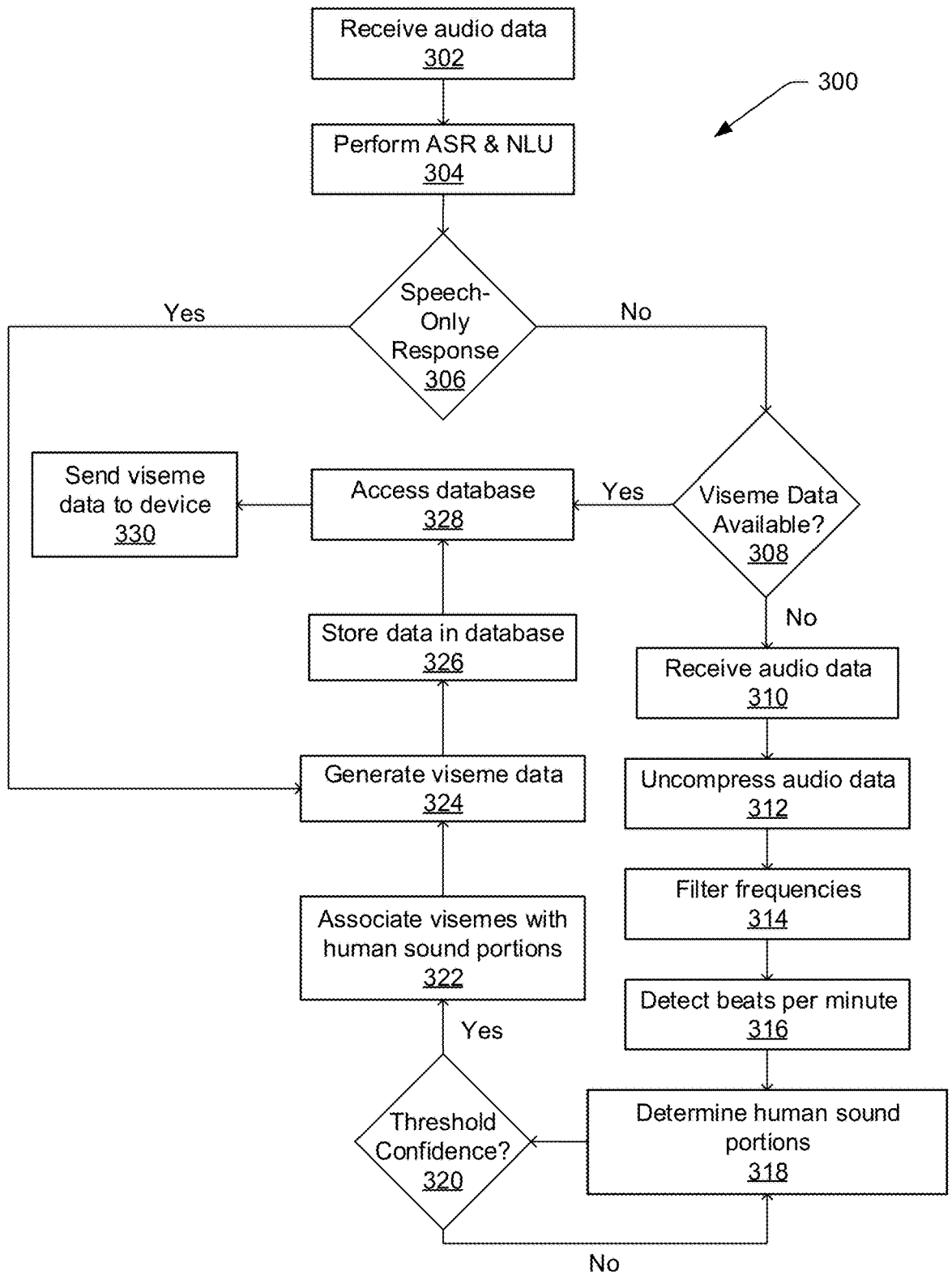
FIG. 3 illustrates a flow diagram of an example process for viseme data generation.

FIG. 3 illustrates a flow diagram of an example process 300 for viseme data generation. The order in which the operations or steps are described is not intended to be construed as a limitation, and any number of the described operations may be combined in any order and/or in parallel to implement process 300.

At block 302, process 300 may include receiving audio data, such as from a user device. The audio data may be generated by one or more microphones of the user device and may correspond to audio provided by the user of the user device. By way of example, the audio may correspond to a user command of "Alexa, play You're Welcome."

At block 304, the process may include performing automatic speech recognition (ASR) on the audio data to generate text data corresponding to the audio data. Using the example from block 302, ASR may be performed on the audio data to generate text data that includes the phrase "Alexa, play You're Welcome." The use of ASR to generate text data is described in more detail below with respect to FIG. 7. Also at block 304, one or more intents associated with the audio data may be determined from the text data utilizing natural language understanding (NLU) techniques. The use of NLU to determine the intents is described in more detail below with respect to FIG. 7. In the example from block 302, NLU techniques may be performed to determine that an intent of playing music corresponds to the audio data and that a song to be played is titled "You're Welcome." In other examples, a command may not include audio data, but instead may be a text-based command and/or a selection of command options. In these examples, one or more of the operations described with respect to blocks 302 and/or 304 may not be performed.

At block 306, the process 300 may include determining if a response to be output by the user device is a speech-only response or a response that includes audio corresponding to non-speech, such as sounds made by musical instruments. In the example used herein where the response includes outputting a song titled "You're Welcome," the response will contain human sound, such as lyrics, and sounds produced by musical instruments. In other examples, the audio from the user may correspond to a request for information, such as "Alexa, what time is it?" The response in this example may be a speech-only response, such as "the time is 10:00 am." In the speech-only examples provided herein, a component of the remote system may determine that a response should be generated using text-to-speech techniques, described more fully with respect to FIG. 7, below. In these examples, determining that a response includes human sound only may be based at least in part on an indication that the response is generated via text-to-speech. Each of these scenarios and the operations that follow will be described below.

If the response includes just human sound components, then the process may continue to block 324 where viseme data corresponding to the human sound components may be generated and stored in a database, such as at block 326. That database may be accessed, either directly or by requesting access via another service at block 328. If the response includes components other than human sound, the process 300 may continue to block 308 where it may be determined whether viseme data, otherwise described herein as viseme data, has been generated or is otherwise available that corresponds to the response. Using the example from block 302 where the response is playing a song, a determination may be made as to whether viseme data has been generated for the song that was requested by the user. If viseme data has already been generated, then at block 328, a database storing or having access to the viseme data may be accessed and, at block 330, the viseme data may be sent to the user device for presentation in the form of lip syncing while the audio corresponding to the song is output.

If the viseme data is determined to be not available at block 308, then the process 300 may continue to block 310 where the process of generating the viseme data may begin. In examples, a large number of requests to generate viseme data may be provided to the system. In these examples, one or more queues may be established to store and organize the viseme data generation requests. Additionally, or alternatively, one or more priorities may be assigned to the viseme data generation requests. The one or more priorities may be based at least in part on factors such as the number of requests to generate viseme data for a given song, a popularity of the song, a timing of the requests, and/or one or more other factors. At block 310, the audio data corresponding to the response, here a song, may be received. In examples, a copy of a file corresponding to the audio data may be made and received. In other examples, a copy may not be made but the audio data may be accessed from another system. In examples, the received audio data may be in a compressed file format, such as *.MP3 or *.AAC. In these instances, the process 300 may continue to block 312 where the audio data may be uncompressed. Uncompressed audio data, such as in a *.WAV format, may be generated. The uncompressed format may represent the audio data in terms of audio frequencies and acoustic energies, which may correspond to amplitudes.

At block 314, the process 300 may include analyzing the audio data via a frequency filter. The frequency filter may be configured to determine portions of the audio data that do not include frequencies in the human sound range. For example, audio frequencies of human sound may range from approximately 20 hz to approximately 120 hz. Portions of the audio data that do not include audio frequencies within this range likely do not contain human sound, and therefore would not correspond to a portion of the audio data to which lip syncing would be applied. The portions of the audio data that do not include audio frequencies in the range described above may not undergo further analysis for generation of viseme data. It should be understood that the range of audio frequencies corresponding to human sound provided above is by way of illustration only. Other audio frequency ranges may be used instead of or in addition to the range provided herein. For example, contextual information related to the audio data may inform the audio frequency range that the frequency filter may utilize. The contextual information may be, for example an artist associated with a song and/or a genre associated with a song. This contextual information may indicate a different audio frequency range that human sound is produced at, and that alternatively audio frequency range may be utilized by the frequency filter. It should also be understood that while the operation is described with respect to a frequency "filter," the operation may not actually filter out portions of the audio data that do not correspond to human sound frequencies. Instead, the operation may include identifying the portions of the audio data that do not correspond to human sound and may mark or otherwise cause these portions to not undergo further analysis for the purpose of generating viseme data.

The remaining portions of the audio data, which are the portions that may include human sound, may undergo an analysis of the beats per minute (BPM) associated with the audio data at block 316 of the process 300. An analysis of the audio frequencies of the audio data and the acoustic energies of the audio data to determine which portions of the audio data correspond to recurring frequencies and acoustic energies may be performed. For example, portions of the audio data corresponding to sounds produced by percussion instruments may have recurring frequencies and/or acoustic energies throughout the song or portions thereof. Sounds produced by other instruments, such as bass guitars, may also have recurring frequencies and/or acoustic energies throughout the song. These recurring frequencies and/or acoustic energies may be identified as beats, and a number of these recurring frequencies and/or acoustic energies may be measured in a given span of time, such as a second, or in a measure, and converted to beats per minute. It should be understood that while the unit of measure used herein for the recurrence of the beat of a song is provided as BPM, it should be understood that other units of measure may be used, such as beats per measure, beats per second, or other similar units. BPM data may be generated and stored. Additionally, in examples, contextual information, as described above, may be utilized to inform the determination of the BPM. For example, if BPM data is known for a given artist and that BPM data is consistent or relatively consistent, determination of the BPM for a given song by that artist may be biased toward the known BPM data.

At block 318, the process 300 may continue to determining human sound portions of the audio data. In examples, determining human sound portions of the audio data may be performed using a Viterbi algorithm. This operation may include utilizing a Viterbi algorithm to determine, at a given point in the audio data, what the most likely next audio frequency and/or acoustic energy will be. In so doing, the Viterbi algorithm may be utilized to determine where variances in audio frequencies and acoustic energies of the audio data are located in the audio data. The BPM data generated with respect to block 316 may be utilized to identify a sample size of the audio data to be analyzed. The Viterbi algorithm may be utilized to determine variances in the audio frequencies and acoustic energies of the audio data. Portions of the audio data that correspond to high audio frequency variances and/or high acoustic energy variances are more likely to include human sound, while portions of the audio data that correspond to low audio frequency variances and/or low acoustic energy variances are more likely to not include human sound. In examples, a given portion of the audio data may include a small number of variances while another portion of the audio data may include a larger number of variances. In these examples, the portion of the audio data with a small number of variances, such as one variance, may be associated with non-human sounds, such as feedback, while the portion of the audio data with a larger number of variances is more likely to include human sound.

At block 320, the process 300 may include determining whether portions of the audio data corresponding to human sound have been identified to a threshold confidence. If not, the Viterbi algorithm may be used multiple times to more accurately determine the portions of the audio data that correspond to human sound. In examples, the input information for the Viterbi algorithm may be modified with some or each iteration of the Viterbi algorithm. For example, for the initial iteration of the Viterbi algorithm, the array of initial probabilities and sequence of observations may be set to default values and/or may be set based at least in part on the BPM data and/or contextual information associated with the audio data. However, with each iteration of the Viterbi algorithm a hidden state sequence is output, and that hidden state sequence may be utilized to adjust the input probabilities and sequence of observations for the next iteration of the Viterbi algorithm. In examples, this process may be repeated over and over until a threshold confidence level is reached. For example, the Viterbi algorithm may be applied to the audio data until an output variance of the Viterbi algorithm reaches a threshold variance with respect to output of the previous iteration of the Viterbi algorithm. The result of the Viterbi analysis may include data indicating at which points of the audio data human sound starts and stops. These portions of the audio data may be utilized in the following operations to generate viseme data.

Once the portions of the audio data corresponding at least in part to human sound are determined, the process 300 may continue to block 322 where visemes may be associated with the human sound portions of the audio data. To associate visemes with the human sound portions, the acoustic energy levels associated with the audio data may be analyzed. For example, using the categories of visemes described above, for portions of the audio data that do not correspond to human sound, the closed or mostly closed viseme may be utilized or no viseme may be associated with these portions of the audio data. In examples where no viseme is associated with portions of the audio data that do not include human sound, the device presenting the visemes may have a default of a closed mouth position. By way of further example, when the acoustic energy level associated with the human sound is within a given acoustic energy level range, a corresponding viseme may be associated with that portion of the audio data. For example, if acoustic energy is associated with a 1 to 12 scale, different ranges of the scale may be associated with different viseme categories. For example, acoustic energy levels of 1-3 may be associated with the closed or mostly closed viseme, acoustic energy levels of 4-6 may be associated with the slightly open viseme, acoustic energy levels of 7-9 may be associated with the moderately open viseme, and acoustic energy levels of 10-12 may be associated with the completely or mostly open viseme. It should be understood that the acoustic energy level scale provided herein is by way of illustration only and not by way of illustration.

At block 324, the process 300 may include generating viseme data that correlates a timing component of the audio data with at least one of the visemes. In examples, the viseme data may include a time-stamped list of visemes and may include instructions that, when executed by a processor of a device presenting the visemes, may cause presentation of the identified visemes at the times indicated by the viseme data. The viseme data may be stored in a database at block 326. The database may be the same database as described above with respect to viseme data generated for speech-only responses, or the database may be a separate database. Once the viseme data is stored, it may be available for access when viseme data for the audio data is requested. When requested, the process 300 may include accessing the database at block 328 and sending the viseme data at block 330 to a device for presentation of the visemes. In examples, the generation of viseme data may be performed quickly and in these examples, the viseme data may be sent to the requesting device at or near the same time as the request. In other examples, the generation of viseme data may take several minutes or longer. In these examples, the viseme data, once generated, may be stored in a database but may not be sent to the requesting device. Instead, the requesting device may output the requested audio and may provide an indication to the user that the viseme data is not yet available. Once generated, the viseme data may be available for sending to a requesting device for subsequent requests to output the audio.

The database described with respect to block 326 may also include data associated with the visemes. The database may include a list of visemes and instructions that, when executed by a processor, cause a device having and/or depicting a mouth to move to a mouth.

Figure 4:
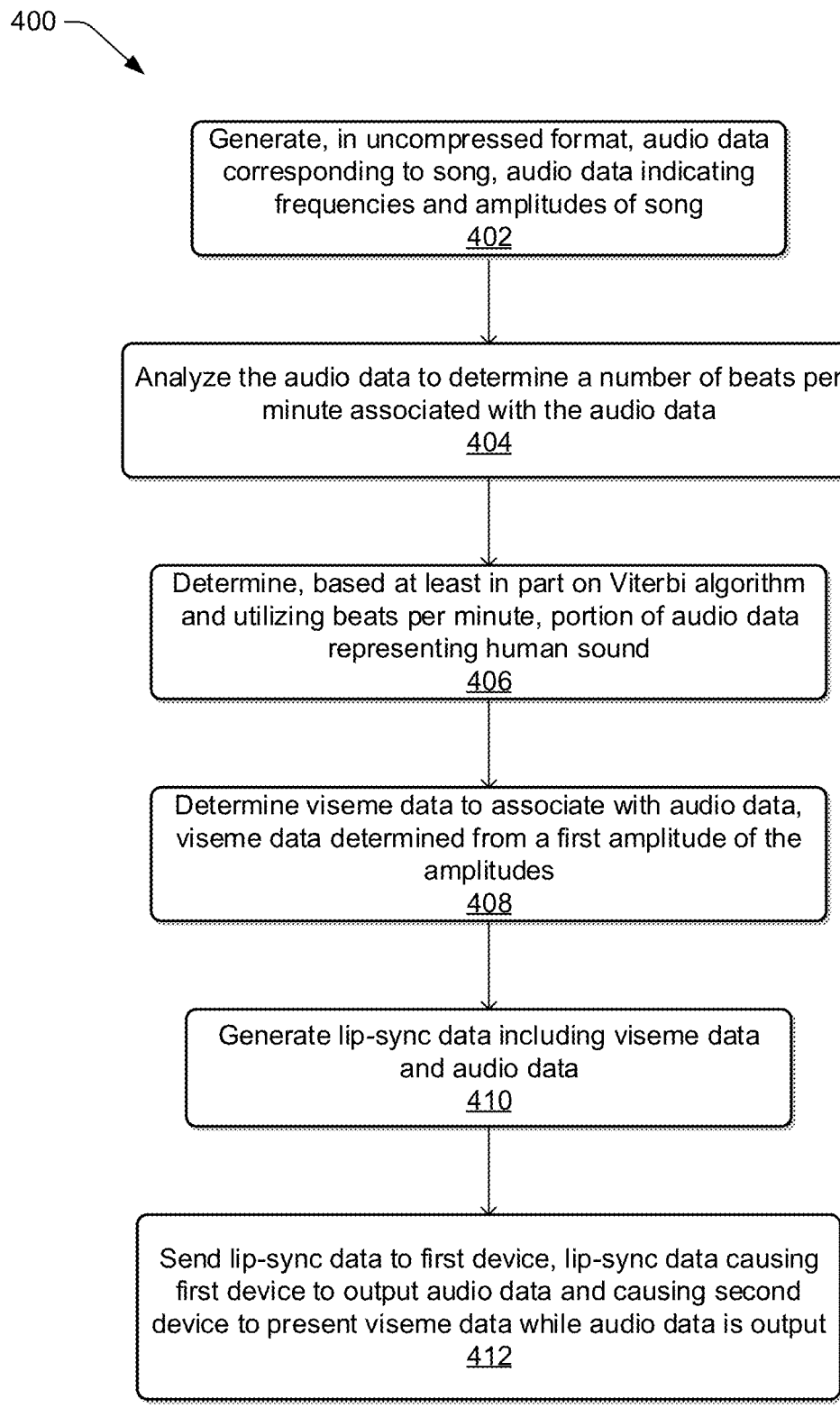
FIG. 4 illustrates a flow diagram of another example process for viseme data, also described herein as lip-sync data, generation.

FIG. 4 illustrates a flow diagram of another example process 400 for lip-sync data generation. The order in which the operations or steps are described is not intended to be construed as a limitation, and any number of the described operations may be combined in any order and/or in parallel to implement process 400.

At block 402, process 400 may include generating, in an uncompressed format, audio data corresponding to a song. The audio data may indicate frequencies and amplitudes of the song. In examples, the audio data may be received as a file and/or the audio data may be accessed from another system. In examples, the received audio data may be in a compressed file format, such as *.MP3 or *.AAC. In these instances, the audio data may be uncompressed. Uncompressed audio data, such as in a *.WAV format, may be generated. The uncompressed format may represent the audio data in terms of audio frequencies and acoustic energies, which may correspond to amplitudes.

At block 404, the process 400 may include analyzing the audio data to determine a number of beats per minute associated with the audio data. An analysis of the audio frequencies of the audio data and the acoustic energies of the audio data to determine which portions of the audio data correspond to recurring frequencies and acoustic energies may be performed. For example, portions of the audio data corresponding to sounds produced by percussion instruments may have recurring frequencies and/or recurring acoustic energies throughout the song or portions thereof. Sounds produced by other instruments, such as bass guitars, may also have recurring frequencies and/or recurring acoustic energies throughout the song. These recurring frequencies and/or recurring acoustic energies may be identified as beats, and a number of these recurring frequencies and/or recurring acoustic energies may be measured in a given span of time, such as a second, or in a measure, and converted to beats per minute. It should be understood that while the unit of measure used herein for the recurrence of the beat of a song is provided as BPM, it should be understood that other units of measure may be used, such as beats per measure, beats per second, or other similar units. BPM data may be generated and stored. Additionally, in examples, contextual information may be utilized to inform the determination of the BPM. For example, if BPM data is known for a given artist and that BPM data is consistent or corresponds to at least a threshold consistency, determination of the BPM for a given song by that artist may be biased toward the known BPM data.

At block 406, the process 400 may include determining, based at least in part on a Viterbi algorithm and utilizing the beats per minute, a portion of the audio data representing human sound. This operation may include utilizing a Viterbi algorithm to determine, at a given point in the audio data, what the most likely next audio frequency and/or acoustic energy will be. In so doing, the Viterbi algorithm may be utilized to determine where variances in audio frequencies and acoustic energies of the audio data are located with respect to the audio data. The BPM data generated with respect to block 404 and/or accessed from another database and/or system may be utilized to identify a sample size of the audio data. The Viterbi algorithm may be utilized to determine variances in the audio frequencies and acoustic energies of the audio data. Portions of the audio data that correspond to high audio frequency variances and/or high acoustic energy variances are more likely to include human sound, while portions of the audio data that correspond to low audio frequency variances and/or low acoustic energy variances are more likely to not include human sound.

This operation may be repeated until portions of the audio data corresponding to human sound have been identified to a threshold confidence. If the threshold confidence has not been reached, the Viterbi algorithm may be used multiple times to more accurately determine the portions of the audio data that represent human sound. In examples, the input information for the Viterbi algorithm may be modified with some or each iteration of the Viterbi algorithm. For example, for the initial iteration of the Viterbi algorithm, the array of initial probabilities and sequence of observations may be set to default values and/or may be set based at least in part on the BPM data and/or contextual information associated with the audio data. However, with each iteration of the Viterbi algorithm, a hidden state sequence is output, and that hidden state sequence may be utilized to adjust the input probabilities and sequence of observations for the next iteration of the Viterbi algorithm. In examples, this process may be repeated over and over until a threshold confidence level is reached. For example, the Viterbi algorithm may be applied to the audio data until an output variance of the Viterbi algorithm reaches a threshold variance with respect to output of the previous iteration of the Viterbi algorithm. The result of the Viterbi analysis may include data indicating at which points of the audio data human sound starts and stops.

At block 408, the process 400 may include determining viseme data to associate with the audio data. The viseme data may be determined based at least in part on at least one of the amplitudes. As used with respect to FIG. 4, viseme data may include indicators of visemes and/or viseme categories. For example, using the categories of visemes described above, for portions of the audio data that do not represent human sound, the closed or mostly closed viseme identifier may be utilized or no viseme identifier may be associated with these portions of the audio data. In examples where no viseme identifier is associated with portions of the audio data that do not include human sound, the device presenting the visemes may have a default of a closed mouth position. By way of further example, when the acoustic energy level associated with the human sound is within a given acoustic energy level range, a corresponding viseme identifier may be associated with that portion of the audio data. For example, if acoustic energy is associated with a 1 to 12 scale, different ranges of the scale may be associated with different viseme categories. For example, acoustic energy levels of 1-3 may be associated with the closed or mostly closed viseme, acoustic energy levels of 4-6 may be associated with the slightly open viseme, acoustic energy levels of 7-9 may be associated with the moderately open viseme, and acoustic energy levels of 10-12 may be associated with the completely or mostly open viseme. It should be understood that the acoustic energy level scale provided herein is by way of illustration only and not by way of limitation.

By way of further examples, it may be determined that a first amplitude associated with a first portion of the audio data is within a first amplitude range and a second amplitude associated with a second portion of the audio data is within a second amplitude range. The first amplitude range may be greater than or less than the second amplitude range. A first viseme may be associated with the first portion of the audio data based at least in part on the first amplitude being with the first amplitude range. A second viseme may be associated with the second portion of the audio data based at least in part on the second amplitude being within the second amplitude range. In instances where the first amplitude range is greater than the second amplitude range, the second viseme may correspond to a mouth position that is more closed than the first viseme. In instances where the first amplitude range is less than the second amplitude range, the second viseme may correspond to a mouth position that is more open than the first viseme.

Other scales and units may be utilized to categorize acoustic energy levels and associate those energy levels with visemes, such as, for example, decibels. It should also be understood that while the acoustic energy level ranges described here are static and have similar ranges, in other examples, the ranges may be dynamic such that one or more of the ranges change over time, such as in response to feedback on the accuracy of viseme association with audio data. Additionally, or alternatively, one acoustic energy level range may have a smaller range than another range. Using the example above to illustrate, a first acoustic energy level range may be 1-2 while a second acoustic energy level range may be 3-7, for example. In other examples, associating visemes with portions of the audio data may be performed randomly such that one or more visemes are associated with the audio data without regard to the acoustic energy levels of the audio data.

At block 410, the process 400 may include generating lip-sync data including the viseme data and the audio data. Generating lip-sync data may include correlating a timing component of the audio data with at least one of the visemes. In examples, the lip-sync data may include a time-stamped list of visemes and may include instructions that, when executed by a processor of a device presenting the visemes, may cause presentation of the identified visemes at the times indicated by the lip-sync data. The lip-sync data may be stored in a database. Once the lip-sync data is stored, it may be available for access when lip-sync data for the audio data is requested.

At block 412, the process 400 may include sending the lip-sync data to a first device. The lip-sync data may cause the first device to output audio data and may cause a second device to present the viseme data while the audio data is output. In examples, the first device may be a voice-controlled device. The voice-controlled device may include a display, and in these examples, the viseme data may be presented via the display utilizing an animation of a mouth moving. The voice-controlled device may also output audio corresponding to the audio data while displaying the animation. In other examples, the voice-controlled device may not include a display. In these examples, the voice-controlled device may output the audio corresponding to the audio data and may cause a second device to present the viseme data. For example, the second device may be an accessory device that includes a display, and in these instances, the second device may display an animation of a mouth moving. Additionally, or alternatively, the second device may be an animatronic toy with a movable mouth portion. In these instances, the moveable mouth portion of the second device may move based at least in part on the lip-sync data.

The process 400 may also include combining text-to-speech audio data with other forms of audio data, such as audio data corresponding to a song. In some examples, a user may submit a command that calls for a speech-only response, such as an answer to a question. By way of example, the user may ask "what is the weather like right now?" In response, text-to-speech audio data may be generated that provides a response to the user, such as "it is 75 degrees outside right now." In other examples, a user may submit a command that calls for a portion of the response to be human sound only, while another portion may include another form of audio data. For example, a user may say "play the song 'You're Welcome.'" In response, text-to-speech audio data may be generated that provides a response to the user, such as "playing the song 'You're Welcome,'" and then audio corresponding to the song "You're Welcome" may be output. In this example, the response includes a text-to-speech audio data component and a component that corresponds to a song. Viseme data may be generated and/or accessed for both of these components and lip syncing may be performed based on the viseme data. In examples where an accessory device, such as an animatronic toy presents visemes, the animatronic toy and/or the user device, such as a voice-assistant device, may output audio corresponding to the audio data. Which device outputs audio may depend on the type of response. For example, in examples where the text-to-speech audio data is combined with other audio data, the accessory device may output the audio corresponding to the text-to-speech audio data, but the voice-assistant device may output the audio corresponding to the other audio data, such as a song. In other examples, the voice-assistant device may output all audio and the accessory device may present the visemes.

The process 400 may also include identifying contextual information associated with the song. The contextual information may include at least one of an artist associated with the song or a genre associated with the song. An audio frequency range of human sound associated with the contextual information may be determined, and this audio frequency range may be utilized to determine the portion of the audio data representing the human sound. By way of example, the song may be a country song with an artist having a characteristically low and/or deep voice. The genre of country music may be associated with an audio frequency range that is more limited than human sound generally. Additionally, or alternatively, the artist associated with the song may be associated with another audio frequency range that is more limited than human sound generally and/or country music generally. This information can be utilized to bias the determination of which portions of the audio data represent human sound. For example, the input information for the Viterbi algorithm may be modified based on this contextual information and/or, in instances where a frequency filter is utilized, as described herein, the frequency filter may be adjusted to the audio frequency range associated with the contextual information.

The process 400 may also include identifying a portion of the audio data corresponding to at least one frequency that is outside a range of frequencies representing human sound. Determining the portion of the audio data corresponding to human sound may include excluding the portion outside the range of frequencies. For example, audio frequencies of human sound may range from approximately 20 hertz (hz) to approximately 120 hz. Portions of the audio data that do not include audio frequencies within this range likely do not contain human sound, and therefore would not correspond to a portion of the audio data to which lip syncing would be applied. The portions of the audio data that do not include audio frequencies in the range described above may not undergo further analysis for generation of lip-sync data. It should be understood that the range of audio frequencies corresponding to human sound provided above is by way of illustration only. It should also be understood that while this operation is described as a "filter," the frequency filter may not actually filter out portions of the audio data that do not correspond to human sound frequencies. Instead, the frequency filter may identify the portions of the audio data that do not correspond to human sound and may mark or otherwise cause these portions to not undergo further analysis for the purpose of generation lip-sync data.

Figure 5:
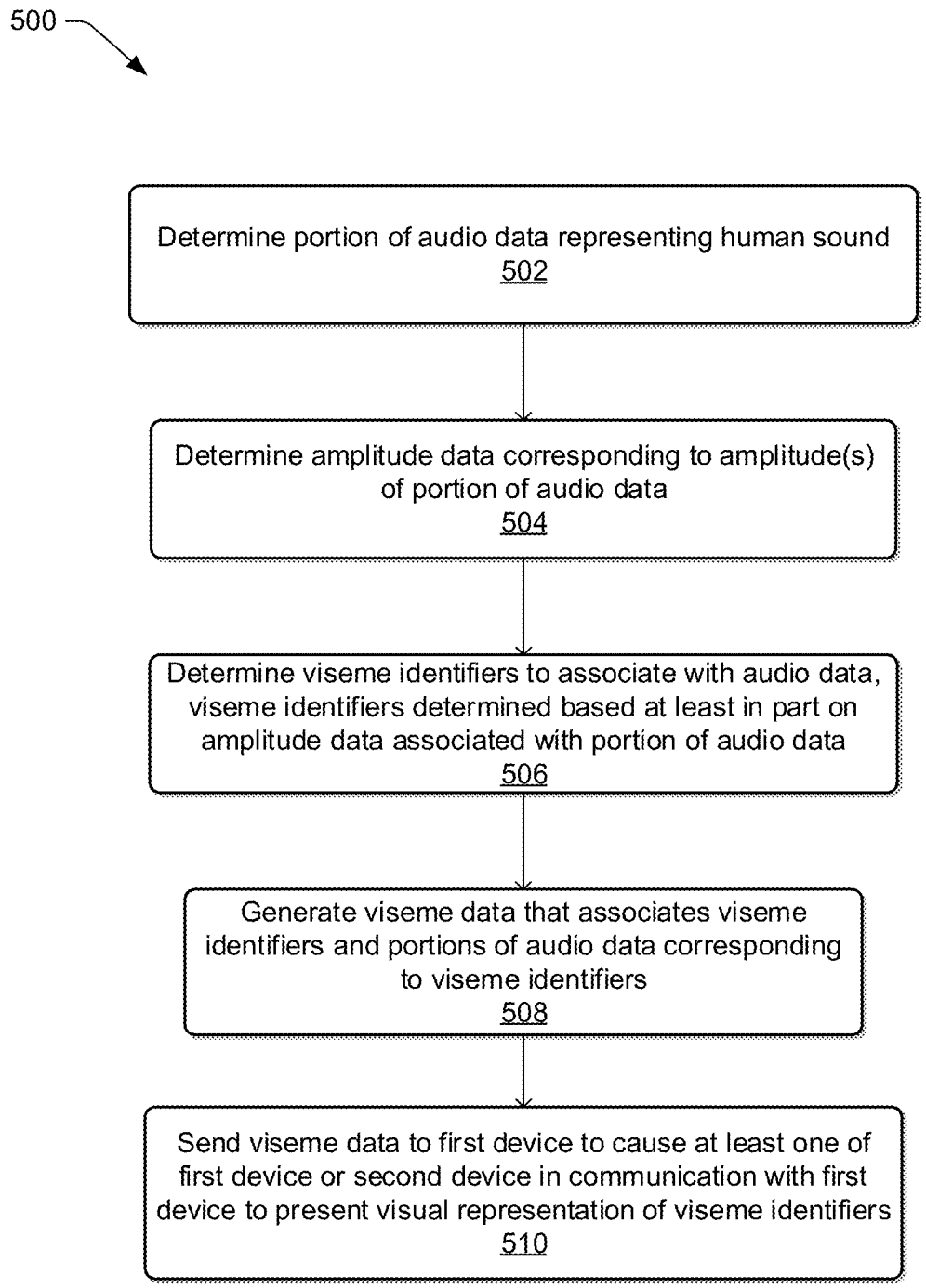
FIG. 5 illustrates a flow diagram of another example process for viseme data generation.

FIG. 5 illustrates a flow diagram of another example process 500 for viseme data generation. The order in which the operations or steps are described is not intended to be construed as a limitation, and any number of the described operations may be combined in any order and/or in parallel to implement process 500.

At block 502, the process 500 may include determining a portion of audio data representing human sound. This operation may include utilizing a Viterbi algorithm to determine, at a given point in the audio data, what the most likely next audio frequency and/or acoustic energy will be. In so doing, the Viterbi algorithm may be utilized to determine where variances in audio frequencies and acoustic energies of the audio data are located with respect to the audio data. The Viterbi algorithm may be utilized to determine variances in the audio frequencies and acoustic energies of the audio data. Portions of the audio data that correspond to high audio frequency variances and/or high acoustic energy variances are more likely to include human sound, while portions of the audio data that correspond to low audio frequency variances and/or low acoustic energy variances are more likely to not include human sound.

This operation may be repeated until portions of the audio data corresponding to human sound have been identified to a threshold confidence. If the threshold confidence has not been reached, the Viterbi algorithm may be used multiple times to more accurately determine the portions of the audio data that represent human sound. In examples, the input information for the Viterbi algorithm may be modified with some or each iteration of the Viterbi algorithm. For example, for the initial iteration of the Viterbi algorithm, the array of initial probabilities and sequence of observations may be set to default values and/or may be set based at least in part on BPM data and/or contextual information associated with the audio data. However, with each iteration of the Viterbi algorithm, a hidden state sequence is output, and that hidden state sequence may be utilized to adjust the input probabilities and sequence of observations for the next iteration of the Viterbi algorithm. In examples, this process may be repeated over and over until a threshold confidence level is reached. For example, the Viterbi algorithm may be applied to the audio data until an output variance of the Viterbi algorithm reaches a threshold variance with respect to output of the previous iteration of the Viterbi algorithm. The result of the Viterbi analysis may include data indicating at which points of the audio data human sound starts and stops.

At block 504, the process 500 may include determining amplitude data corresponding to one or more amplitudes of the portion of the audio data representing the human sound. The amplitude data may include acoustic energies associated with the audio data. The amplitude data may be represented as a scale of amplitudes, which is described in more detail with respect to block 506, below.

At block 506, the process 500 may include determining viseme identifiers to associate with the audio data. The viseme identifiers may be determined based at least in part on the amplitude data associated with the component of the audio data. To associate viseme identifiers with the human sound components of the song, the acoustic energy levels, also described as amplitudes, associated with the audio data may be analyzed. For example, using the categories of visemes described above, for portions of the audio data that do not represent human sound, the closed or mostly closed viseme identifier may be utilized or no viseme identifier may be associated with these portions of the audio data. In examples where no viseme identifier is associated with portions of the audio data that do not include human sound, the device presenting the visemes may have a default of a closed mouth position. By way of further example, when the amplitude associated with the human sound is within a given amplitude range, a corresponding viseme identifier may be associated with that portion of the audio data. For example, if amplitude is associated with a 1 to 12 scale, different ranges of the scale may be associated with different viseme categories. For example, amplitudes of 1-3 may be associated with the closed or mostly closed viseme identifier, amplitudes of 4-6 may be associated with the slightly open viseme identifier, amplitudes of 7-9 may be associated with the moderately open viseme identifier, and amplitudes of 10-12 may be associated with the completely or mostly open viseme identifier. It should be understood that the amplitude scale provided herein is by way of illustration only and not by way of limitation.

By way of further examples, it may be determined that a first amplitude associated with a first portion of the audio data is within a first amplitude range and a second amplitude associated with a second portion of the audio data is within a second amplitude range. The first amplitude range may be greater than or less than the second amplitude range. A first viseme identifier may be associated with the first portion of the audio data based at least in part on the first amplitude being with the first amplitude range. A second viseme identifier may be associated with the second portion of the audio data based at least in part on the second amplitude being within the second amplitude range. In instances where the first amplitude range is greater than the second amplitude range, the second viseme identifier may correspond to a mouth position that is more closed than the first viseme identifier. In instances where the first amplitude range is less than the second amplitude range, the second viseme identifier may correspond to a mouth position that is more open than the first viseme identifier.

Other scales and units may be utilized to categorize amplitudes and associate those amplitudes with viseme identifiers, such as, for example, decibels. It should also be understood that while the amplitude ranges described here are static and have similar ranges, in other examples, the ranges may be dynamic such that one or more of the ranges change over time, such as in response to feedback on the accuracy of viseme association with audio data. Additionally, or alternatively, one amplitude range may have a smaller range than another range. Using the example above to illustrate, a first amplitude range may be 1-2 while a second amplitude range may be 3-7, for example. In other examples, associating visemes with portions of the audio data may be performed randomly such that one or more viseme identifiers are associated with the audio data without regard to the acoustic energy levels of the audio data.

At block 508, the process 500 may include generating viseme data that associates the viseme identifiers and portions of the audio data corresponding to the viseme identifiers. Generating viseme data may include correlating a timing component of the audio data with at least one of the viseme identifiers. In examples, the viseme data may include a time-stamped list of viseme identifiers and may include instructions that, when executed by a processor of a device presenting the visemes, may cause presentation of the identified visemes at the times indicated by the viseme data. The viseme data may be stored in a database. Once the viseme data is stored, it may be available for access when viseme data for the audio data is requested.

At block 510, the process 500 may include sending the viseme data to a first device. The first device or a second device may present a visual representation of the viseme identifiers while audio corresponding to the audio data is output. In examples, the first device may be a voice-controlled device. The voice-controlled device may include a display, and in these examples, the visual representation may be presented via the display utilizing an animation of a mouth moving. The voice-controlled device may also output audio corresponding to the audio data while displaying the animation. In other examples, the voice-controlled device may not include a display. In these examples, the voice-controlled device may output the audio corresponding to the audio data and may cause a second device to present the visual representation of the viseme identifiers. For example, the second device may be an accessory device that includes a display, and in these instances, the second device may display an animation of a mouth moving. Additionally, or alternatively, the second device may be an animatronic toy with a movable mouth portion. In these instances, the moveable mouth portion of the second device may move based at least in part on the viseme data.

The process 500 may additionally include generating the audio data in an uncompressed format. The audio data may indicate frequencies and amplitudes of the audio data. In examples, the audio data may be received as a file and/or the audio data may be accessed from another system. In examples, the received audio data may be in a compressed file format, such as *.MP3 or *.AAC. In these instances, the audio data may be uncompressed. Uncompressed audio data, such as in a *.WAV format, may be generated. The uncompressed format may represent the audio data in terms of audio frequencies and acoustic energies, which may correspond to amplitudes.

The process 500 may additionally, or alternatively, include determining a number of beats per minute (BPM) associated with the audio data and modifying at least one of the Viterbi algorithm or input values for the Viterbi algorithm based at least in part on the number of the beats per minute. An analysis of the audio frequencies of the audio data and the acoustic energies of the audio data to determine which portions of the audio data correspond to recurring frequencies and acoustic energies may be performed. For example, portions of the audio data corresponding to sounds produced by percussion instruments may have recurring frequencies and/or recurring acoustic energies throughout the song or portions thereof. Sounds produced by other instruments, such as bass guitars, may also have recurring frequencies and/or recurring acoustic energies throughout the song. These recurring frequencies and/or recurring acoustic energies may be identified as beats, and a number of these recurring frequencies and/or recurring acoustic energies may be measured in a given span of time, such as a second, or in a measure, and converted to beats per minute. It should be understood that while the unit of measure used herein for the recurrence of the beat of a song is provided as BPM, it should be understood that other units of measure may be used, such as beats per measure, beats per second, or other similar units. BPM data may be generated and stored. Additionally, in examples, contextual information may be utilized to inform the determination of the BPM. For example, if BPM data is known for a given artist and that BPM data is consistent or corresponds to at least a threshold consistency, determination of the BPM for a given song by that artist may be biased toward the known BPM data.

The process 500 may additionally, or alternatively, include identifying a portion of the audio data corresponding to a frequency that is outside of a range of frequencies corresponding to human sound. The determination of the component of the audio data corresponding to human sound may include excluding the portion outside of the range of frequencies. For example, audio frequencies of human sound may range from approximately 20 hertz (hz) to approximately 120 hz. Portions of the audio data that do not include audio frequencies within this range likely do not contain human sound, and therefore would not correspond to a portion of the audio data to which lip syncing would be applied. The portions of the audio data that do not include audio frequencies in the range described above would not undergo further analysis for generation of viseme data. It should be understood that the range of audio frequencies corresponding to human sound provided above is by way of illustration only. It should also be understood that while this operation is described as a "filter," the frequency filter may not actually filter out portions of the audio data that do not correspond to human sound frequencies. Instead, the frequency filter may identify the portions of the audio data that do not correspond to human sound and may mark or otherwise cause these portions to not undergo further analysis for the purpose of generation viseme data.

The process 500 may additionally, or alternatively, include sending the viseme data to the first device based at least in part on the second device being in at least one of wired or wireless communication with the first device. The functionalities may additionally, or alternatively, include determining, such as via user profile data, that a user of the first device is hearing impaired and sending the viseme data to the first device based at least in part on determining that the user is hearing impaired. Additional, or alternative, data may indicate that the viseme data should be sent to the first device and/or the second device. For example, data indicating a user preference for lip syncing to accompany the output of audio may be used. Additionally, or alternatively, the system may receive data representing a request for lip syncing at the first device and/or the second device.

The process 500 may additionally, or alternatively, include receiving, from the first device, second audio data representing a request for the first device to output a speech-based response. The process 500 may include identifying a word corresponding to the speech-based response and determining at least one of the visemes to associate with the word. The first device may be caused to output second audio corresponding to the speech-based response and the second device may be caused to present the at least one of the visemes during output of the second audio. Given that the response is a speech-based response, the operations of determining which portions of audio data correspond to human sound and determining the BPM of the response may not be performed.

The process 500 may additionally, or alternatively, include generating text data based at least in part on automatic speech recognition performed on the component of the audio data corresponding to the human sound. The text data may indicate words or phrases corresponding to the human sound. Determining the visemes to associate with the audio data may be based at least in part on the text data. Generating the text data may be performed as described more fully with respect to FIG. 7. Determining the visemes to associate with the audio data based on the text data may be performed as described more fully with respect to FIG. 9.

The process 500 may additionally, or alternatively, include receiving feedback data indicating an accuracy of the viseme data and modifying at least one of the Viterbi algorithm or the input values for the Viterbi algorithm based at least in part on the feedback data. The feedback data may be received from user devices, such as the first device and/or the second device and may be provided to the remote system. The feedback data may be generated based on a response from a user to a query for feedback on the accuracy of the viseme data.

Figure 6:
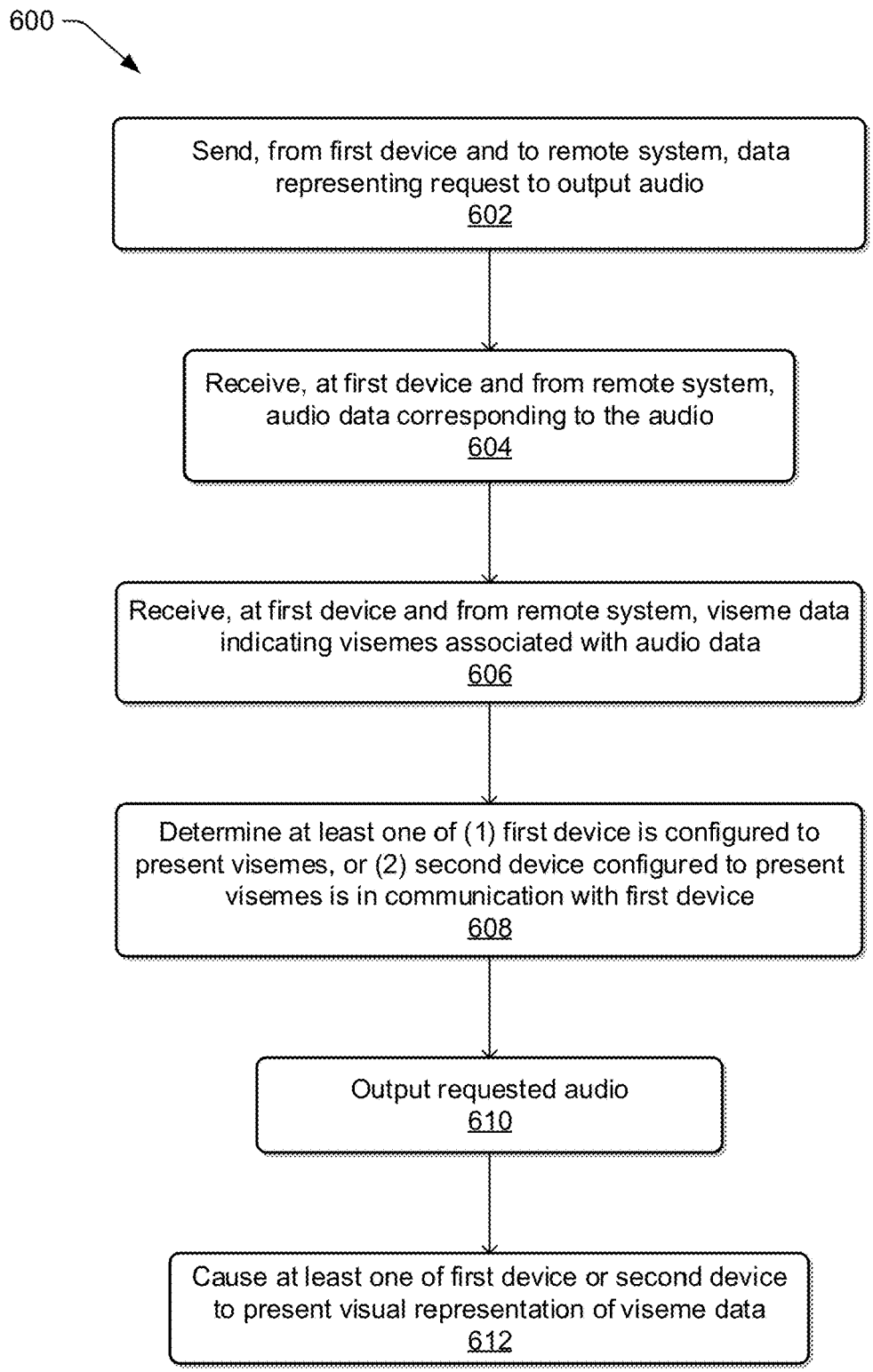
FIG. 6 illustrates a flow diagram of an example process for receiving and utilizing viseme data.

FIG. 6 illustrates a flow diagram of an example process 600 for receiving and utilizing viseme data. The order in which the operations or steps are described is not intended to be construed as a limitation, and any number of the described operations may be combined in any order and/or in parallel to implement process 600.

At block 602, the process 600 may include sending, from a first device to a remote system, data representing a request to output audio. In examples, the audio may correspond to a song. The request may be an audible request from the user that is captured by one or more microphones of the first device. The microphones may generate corresponding audio data and the first device may send that audio data to the remote system over the networks and via the network interfaces described herein. In other examples, the request may not be an audible request, such as a text-based request and/or selection of one or more request options. Data corresponding to the text-based request and/or the selection may be sent to the remote system.

At block 604, the process 600 may include receiving, at the first device and from the remote system, the requested audio data. The remote system may send a copy of audio data stored in a database of the remote system and/or the remote system may cause the audio data to be streamed to the first device from the remote system or from another system.

At block 606, the process 600 may include receiving, at the first device and from the remote system, viseme data indicating visemes associated with the audio data.

At block 608, the process 600 may include determining at least one of (1) the first device is configured to present visemes, or (2) a second device configured to present visemes is in communication with the first device. The determination may be based at least in part on information stored in and/or accessible from one or more user profiles and/or user accounts, which may store data indicating associations between devices, profiles, accounts, and/or users. The first device being in communication with the second device may include, for example, a wired connection, a wireless connection, a Bluetooth pairing, the two devices being within a threshold distance from each other, and/or within radio frequency identification communication. Data representing the viseme configuration of the first and/or the second device may be sent over the networks and via the network interfaces as described herein.

The visemes may be determined based at least in part on amplitude data associated with the component of the audio data. To associate visemes with the human sound components of the song, the amplitudes associated with the audio data may be analyzed. For example, using the categories of visemes described above, for portions of the audio data that do not correspond to human sound, the closed or mostly closed viseme may be utilized or no viseme may be associated with these portions of the audio data. In examples where no viseme is associated with portions of the audio data that do not include human sound, the device presenting the visemes may have a default of a closed mouth position. By way of further example, when the amplitude associated with the human sound is within a given amplitude range, a corresponding viseme may be associated with that portion of the audio data. For example, if amplitude is associated with a 1 to 12 scale, different ranges of the scale may be associated with different viseme categories. For example, amplitudes of 1-3 may be associated with the closed or mostly closed viseme, amplitudes of 4-6 may be associated with the slightly open viseme, amplitudes of 7-9 may be associated with the moderately open viseme, and amplitudes of 10-12 may be associated with the completely or mostly open viseme. It should be understood that the amplitude scale provided herein is by way of illustration only and not by way of limitation. In examples, the viseme data may include a time-stamped list of visemes and may include instructions that, when executed by a processor of a device presenting the visemes, may cause presentation of the identified visemes at the times indicated by the viseme data. In other examples, the viseme data may include timing data indicating which portions of the audio data are associated with the viseme data. In examples, more than one accessory device and/or more than one animation of at least a mouth may be configured to present visemes. In these examples, the timing data may include indications of which visemes from the viseme data are to be presented by one accessory device and which visemes from the viseme data are to be presented by another accessory device. In this way, the multiple accessory devices may be configured to execute presentation of the viseme data in concert with each other.

At block 610, the process 600 may include outputting audio corresponding to the audio data. The audio may be output via one or more speakers of the first device, the second device, and/or another device.

At block 612, the process 600 may include causing at least one of the first device or the second device to present a visual representation of the viseme data. The viseme data may cause the first device and/or the second device to present the visual representation while audio corresponding to the audio data is output. In examples, the first device may be a voice-controlled device. The voice-controlled device may include a display, and in these examples, the visual representation may be presented via the display utilizing an animation of a mouth moving. The voice-controlled device may also output audio corresponding to the audio data while displaying the animation. In other examples, the voice-controlled device may not include a display. In these examples, the voice-controlled device may output the audio corresponding to the audio data and may cause a second device to present the visual representation. For example, the second device may be an accessory device that includes a display, and in these instances, the second device may display an animation of a mouth moving. Additionally, or alternatively, the second device may be an animatronic toy with a movable mouth portion. In these instances, the moveable mouth portion of the second device may move based at least in part on the viseme data.

The process 600 may additionally, or alternatively, include determining an identity of a user in proximity to the first device and identifying a user profile associated with the user. A determination may be made that the user profile indicates that the user is hearing impaired. An indication of the hearing-impaired nature of the user may be included in the configuration data, and receiving the viseme data from the remote system may be based at least in part on this indication.

The process 600 may additionally, or alternatively, include receiving beat data indicating a number of beats per minute associated with the song and causing presentation of a visual representation of the song based at least in part on the number of beats per minute. A device, such as the second device may include one or more lights, such as, for example, light emitting diodes (LEDs). Computer-readable media of the second device may cause one or more processors of the device to activate and deactivate the lighting element or portions thereof to provide a visual display of the audio data. For example, the lighting element may be activated and deactivated with the beat of the audio data, such as when the audio data corresponds to a song. In other words, lights of the lighting element may turn on when certain sounds from the song are output by the speakers of the device or speakers of another device. Additionally, or alternatively, an intensity of the lights may vary with the sounds emitted from the speakers. For example, the intensity of the lights may increase when the acoustic energy level of the audio data increases, while the intensity of the lights may decrease when the acoustic energy level of the audio data decreases. Additionally, or alternatively, the number of lights of the lighting element that are activated may be based at least in part on the acoustic energy level.

Additionally, or alternatively, the device may include one or more appendages. The computer-readable media may cause the processors of the device to move the appendages based at least in part on the beat data or other data associated with the audio data. In this way, the device may be caused to dance or otherwise move to the beat of the song.

FIG. 7 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 114). The various components illustrated may be located on a same or different physical devices. Communication between various components illustrated in FIG. 7 may occur directly or across a network 112. An audio capture component, such as a microphone 156 of the device 102, or another device, captures audio 700 corresponding to a spoken utterance. The device 102 or 104, using a wakeword detection module 701, then processes audio data corresponding to the audio 700 to determine if a keyword (such as a wakeword) is detected in the audio data. Following detection of a wakeword, the device 102 or 104 sends audio data 702 corresponding to the utterance to the remote system 114 that includes an ASR module 703. The audio data 702 may be output from an optional acoustic front end (AFE) 756 located on the device prior to transmission. In other instances, the audio data 702 may be in a different form for processing by a remote AFE 756, such as the AFE 756 located with the ASR module 703 of the remote system 114.

The wakeword detection module 701 works in conjunction with other components of the user device, for example a microphone to detect keywords in audio 700. For example, the device may convert audio 700 into audio data, and process the audio data with the wakeword detection module 701 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 701 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 701 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 702 corresponding to input audio 700 to the remote system 114 for speech processing. Audio data corresponding to that audio may be sent to remote system 114 for routing to a recipient device or may be sent to the remote system 114 for speech processing for interpretation of the included speech (either for purposes of enabling voice-communications and/or for purposes of executing a command in the speech). The audio data 702 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 114, an ASR module 703 may convert the audio data 702 into text. The ASR transcribes audio data into text data representing the words of the speech contained in the audio data 702. The text data may then be used by other components for various purposes, such as executing system commands, inputting data, etc. A spoken utterance in the audio data is input to a processor configured to perform ASR which then interprets the utterance based on the similarity between the utterance and pre-established language models 754 stored in an ASR model knowledge base (ASR Models Storage 752). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 753 stored in an ASR Models Storage 752), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 703 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 756 and a speech recognition engine 758. The acoustic front end (AFE) 756 transforms the audio data from the microphone into data for processing by the speech recognition engine 758. The speech recognition engine 758 compares the speech recognition data with acoustic models 753, language models 754, and other data models and information for recognizing the speech conveyed in the audio data. The AFE 756 may reduce noise in the audio data and divide the digitized audio data into frames representing time intervals for which the AFE 756 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the output from the AFE 756 with reference to information stored in speech/model storage (752). Alternatively, post front-end processed data (such as feature vectors) may be received by the device executing ASR processing from another source besides the internal AFE. For example, the user device may process audio data into feature vectors (for example using an on-device AFE 756) and transmit that information to a server across a network for ASR processing. Feature vectors may arrive at the remote system 114 encoded, in which case they may be decoded prior to processing by the processor executing the speech recognition engine 758.

The speech recognition engine 758 attempts to match received feature vectors to language phonemes and words as known in the stored acoustic models 953 and language models 754. The speech recognition engine 758 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 758 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 114, for natural language understanding (NLU) processing, such as conversion of the text into commands for execution, either by the user device, by the remote system 114, or by another device (such as a server running a specific application like a search engine, etc.).

The device performing NLU processing 705 (e.g., server 114) may include various components, including potentially dedicated processor(s), memory, storage, etc. As shown in FIG. 7, an NLU component 705 may include a recognizer 763 that includes a named entity recognition (NER) module 762 which is used to identify portions of query text that correspond to a named entity that may be recognizable by the system. A downstream process called named entity resolution links a text portion to a specific entity known to the system. To perform named entity resolution, the system may utilize gazetteer information (784*a*-784*n*) stored in entity library storage 782. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 703 based on the utterance input audio 700) and attempts to make a semantic interpretation of the text. That is, the NLU process determines the meaning behind the text based on the individual words and then implements that meaning. NLU processing 705 interprets a text string to derive an intent or a desired action from the user as well as the pertinent pieces of information in the text that allow a device (e.g., device 102) to complete that action. For example, if a spoken utterance is processed using ASR 703 and outputs the text "play You're Welcome" the NLU process may determine that the user intended for the device to output audio corresponding to the song "You're Welcome."

The NLU may process several textual inputs related to the same utterance. For example, if the ASR 703 outputs N text segments (as part of an N-best list), the NLU may process all N outputs to obtain NLU results.

As will be discussed further below, the NLU process may be configured to parse and tag to annotate text as part of NLU processing. For example, for the text "play You're Welcome," "play" may be tagged as a command (to access a song and output corresponding audio) and "You're Welcome" may be tagged as a specific song to be played.

To correctly perform NLU processing of speech input, an NLU process 705 may be configured to determine a "domain" of the utterance so as to determine and narrow down which services offered by the endpoint device (e.g., remote system 114 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 762 receives a query in the form of ASR results and attempts to identify relevant grammars and lexical information that may be used to construe meaning. To do so, the NLU module 705 may begin by identifying potential domains that may relate to the received query. The NLU storage 773 includes a database of devices (774*a*-774*n*) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 763, language model and/or grammar database (776*a*-776*n*), a particular set of intents/actions (778*a*-778*n*), and a particular personalized lexicon (786). Each gazetteer (784*a*-784*n*) may include domain-indexed lexical information associated with a particular user and/or device. For example, the Gazetteer A (784*a*) includes domain-index lexical information 786*aa* to 786*an*. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 764 parses the query to determine an intent or intents for each identified domain, where the intent corresponds to the action to be performed that is responsive to the query. Each domain is associated with a database (778*a*-778*n*) of words linked to intents. For example, a music intent database may link words and phrases such as "quiet," "volume off," and "mute" to a "mute" intent. A voice-message intent database, meanwhile, may link words and phrases such as "send a message," "send a voice message," "send the following," or the like. The IC module 764 identifies potential intents for each identified domain by comparing words in the query to the words and phrases in the intents database 778. In some instances, the determination of an intent by the IC module 764 is performed using a set of rules or templates that are processed against the incoming text to identify a matching intent.

In order to generate a particular interpreted response, the NER 762 applies the grammar models and lexical information associated with the respective domain to actually recognize a mention of one or more entities in the text of the query. In this manner, the NER 762 identifies "slots" or values (i.e., particular words in query text) that may be needed for later command processing. Depending on the complexity of the NER 762, it may also label each slot with a type of varying levels of specificity (such as noun, place, city, artist name, song name, or the like). Each grammar model 776 includes the names of entities (i.e., nouns) commonly found in speech about the particular domain (i.e., generic terms), whereas the lexical information 786 from the gazetteer 784 is personalized to the user(s) and/or the device. For instance, a grammar model associated with the shopping domain may include a database of words commonly used when people discuss shopping.

The intents identified by the IC module 764 are linked to domain-specific grammar frameworks (included in 776) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "play a song" is an identified intent, a grammar (776) framework or frameworks may correspond to sentence structures such as "play the song {song title}" and/or "play {song title}."

For example, the NER module 762 may parse the query to identify words as subject, object, verb, preposition, etc., based on grammar rules and/or models, prior to recognizing named entities. The identified verb may be used by the IC module 764 to identify intent, which is then used by the NER module 762 to identify frameworks. A framework for the intent of "play a song," meanwhile, may specify a list of slots/fields applicable to play the identified "song" and any object modifier (e.g., specifying a music collection from which the song should be accessed) or the like. The NER module 762 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 762 may search the database of generic words associated with the domain (in the knowledge base 772). So, for instance, if the query was "play You're Welcome," after failing to determine which song titled "You're Welcome" should be played, the NER component 762 may search the domain vocabulary for the phrase "You're Welcome." In the alternative, generic words may be checked before the gazetteer information, or both may be tried, potentially producing two different results.

The output data from the NLU processing (which may include tagged text, commands, etc.) may then be sent to a command processor 707. The destination command processor 707 may be determined based on the NLU output. For example, if the NLU output includes a command to send a message, the destination command processor 707 may be a message sending application, such as one located on the user device or in a message sending appliance, configured to execute a message sending command. If the NLU output includes a search request, the destination command processor 707 may include a search engine processor, such as one located on a search server, configured to execute a search command. After the appropriate command is generated based on the intent of the user, the command processor 707 may provide some or all of this information to a text-to-speech (TTS) engine 708. The TTS engine 708 may then generate an actual audio file for outputting the audio data determined by the command processor 707 (e.g., "playing your song," or "lip syncing to . . . "). After generating the file (or "audio data"), the TTS engine 707 may provide this data back to the remote system 114.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 705 during runtime operations where NLU operations are performed on text (such as text output from an ASR component 703). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 763. Each recognizer may include various NLU components such as an NER component 762, IC module 764 and other components such as an entity resolver, or other components.

For example, a messaging domain recognizer 763-A (Domain A) may have an NER component 762-A that identifies what slots (i.e., portions of input text) may correspond to particular words relevant to that domain. The words may correspond to entities such as (for the messaging domain) a recipient. An NER component 762 may use a machine learning model, such as a domain specific conditional random field (CRF) to both identify the portions corresponding to an entity as well as identify what type of entity corresponds to the text portion. The messaging domain recognizer 763-A may also have its own intent classification (IC) component 764-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 114 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 114, as illustrated herein are exemplary, and may be located in a stand-alone device or may be included, in whole or in part, as a component of a larger device or system, may be distributed across a network or multiple devices connected by a network, etc.

FIG. 8 illustrates a user profile storage 802 that includes data regarding user profiles 804. The user profile storage 802 may be part of, or proximate to, the remote system 114, or may otherwise be in communication with various components, for example over the network 112. The user profile storage 802 may include a variety of information related to individual users, accounts, etc. that interact with the device 102, the one or more accessory devices 104, and/or the remote system 114. For illustration, as shown in FIG. 8, the user profile storage 802 may include data regarding the devices associated with particular individual user profiles 804. In an example, the user profile storage 802 is a cloud-based storage. Such data may include device identifier (ID) and internet protocol (IP) address information for different devices as well as names by which the devices may be referred to by a user. Further qualifiers describing the devices may also be listed along with a description of the type of object of the device.

A particular user profile 804 may include a variety of data that may be used by the system. For example, a user profile may include information about what accessory devices 104 are associated with the user and/or the user device 102. The profile 804 may include, for accessory devices 104, a voice-controlled device 102 by which the accessory was "last seen." In this manner, in instances where the user moves an accessory device 104 about an environment, such as from the kitchen to a bedroom, that includes multiple voice-controlled devices 102, the accessory device 104 can wirelessly pair with a closest voice-controlled device 102 in proximity to the accessory device 104 and this information can be sent to the remote system 114 to dynamically update the profile 804 with the voice-controlled device 102 that was last paired with the accessory 104. This accessory-to-device association can be dynamically updated as locations of the devices 102 and 104 change within the environment. Furthermore, the remote system 114 can use these accessory-to-device associations to determine which devices to send information and instructions to in order to coordinate the operation of an accessory 104 with an appropriate voice-controlled device 102. The profile 804 may also include information about how a particular accessory 104 may operate (e.g., display output, light source operation, animatronic movement, audio output, etc.). A user profile 804 may also contain a variety of information that may be used to check conditional statements such as address information, contact information, default settings, device IDs, user preferences, or the like.

Figure 9:
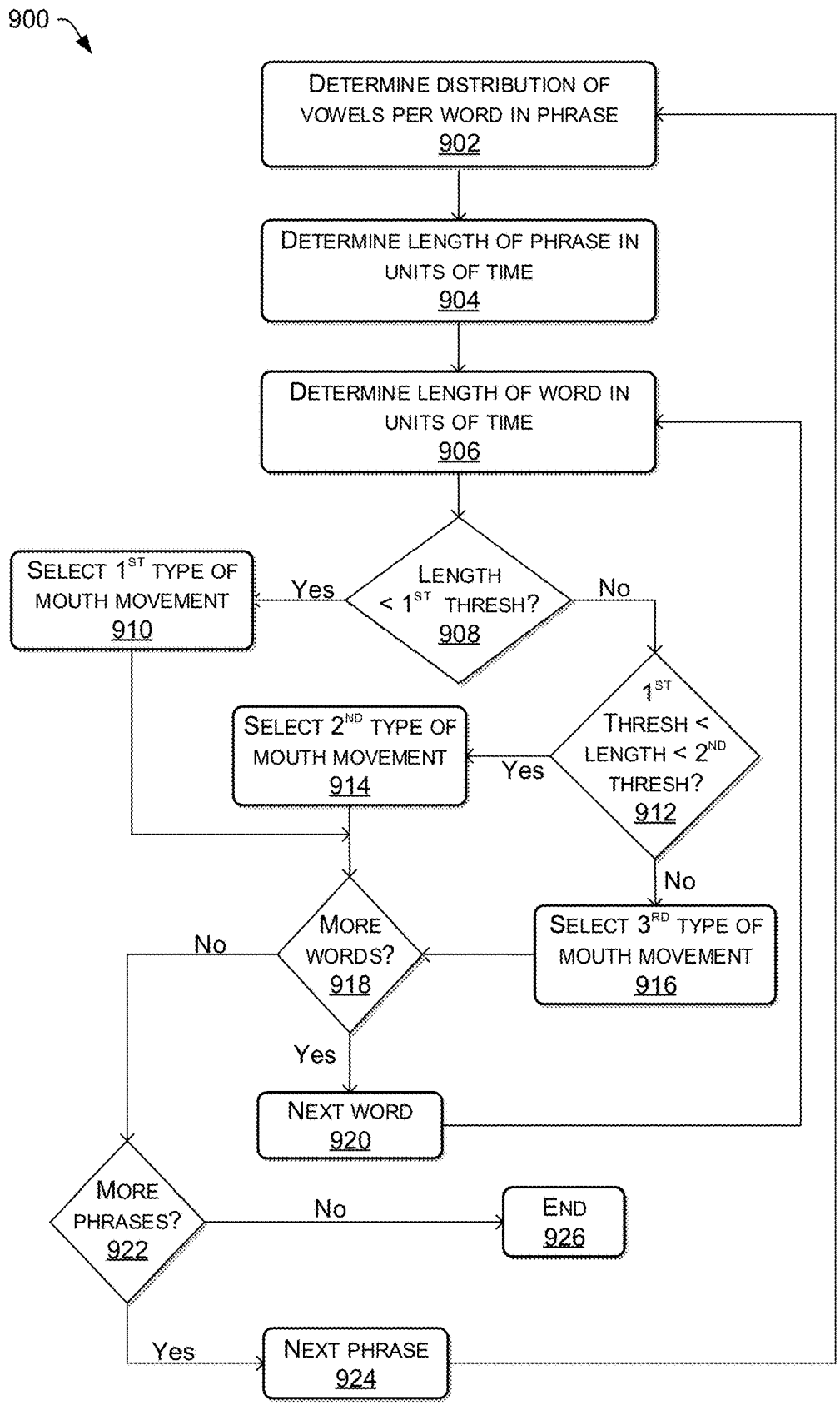
FIG. 9 illustrates a flow diagram of an example process for generating viseme data from a transcription of words associated with audio data.

FIG. 9 illustrates a flow diagram of an example process 900 for generating viseme data from a transcription of words associated with audio data. This process 900 may be utilized in addition to, or alternatively from, the processes 300-600 described above. For example, in instances where viseme categorization is not utilized and instead it is necessary or desired to present more accurate visemes, the process 900 may be utilized.

At block 902, the process 900 may include determining a distribution of vowels per word in a phrase. For example, as described above with respect to FIG. 3, automatic speech recognition may be performed on audio data to generate text data representing words from the audio data. This text data may be described as a transcription of the words in audio content (e.g., lyrics of a song) and the text data may be organized into phrases associated with corresponding timestamps. For instance, a first phrase of a song may be transcribed as the phrase "Don't stop believing." Accordingly, the distribution of vowels of this phrase may be determined at block 902 as 1:1:4 based on the word-vowel associations of "Don't": 1 vowel; "stop": 1 vowel; "believing": 4 vowels.

At block 904, process 900 may include determining an overall length of the phrase in units of time based at least in part on a timestamp corresponding to the phrase. For example, the phrase "Don't stop believing" may have a length of about 4 seconds based on a difference between the timestamp for this phrase and the timestamp of the following phrase in the audio data.

At block 906, the process 900 may include determining a length of each word in units of time based at least in part on the distribution of the vowels per word in the phrase in question determined at block 902. For a phrase that is 4 seconds long, and the example distribution of vowels of {1:1:4}, the first word "Don't" is allocated $\frac{1}{6}^{th}$ of the total length of the phrase because there are 6 total vowels in the phrase "Don't stop believing" and the first word "Don't" has 1 of the 6 vowels. Estimating the time-based length of a word in the phrase in this manner is based on the notion that vowels largely represent the spacing in time as a person speaks. Said another way, the word "Don't" may be allocated approximately ⅔ of a second of mouth movement over the entire phrase having a length of 4 seconds.

At block 908, the process 900 may include determining whether the length of the word determined at block 906 is below a first length threshold. For example, thresholding may be applied along a spectrum of lengths based on heuristics. For example, the first length threshold may be set at 1 second (or another suitable threshold in any suitable unit of time). If it is determined that the length of the word is less than the first threshold, the process 900 follows the "yes" route from block 908 to block 910 where a first viseme is selected for the word. For example, a square wave type viseme may be selected at block 910 such that, upon processing at the one or more accessory devices 104, causes a movable mouth and/or an animation of a mouth of the one or more accessory devices 104 to open the length of the square wave, such as for the entire length of the spoken word.

If it is determined that the length of the word is greater than or equal to the first length threshold, the process 900 follows the "no" route from 908 to 912 where determination may be made as to whether the length of the word determined at block 906 is between the first length threshold and a second length threshold, such as between 1 second and 2 seconds. If the length of the word is between the first and second length thresholds at 912, the process 900 follows the "yes" route from block 912 to block 914 where a second type of viseme may be selected for the word. For example, a predefined waveform for a viseme that is previously-associated with the particular word or portion of the word may be selected as the second type of mouth movement. For example, a predefined waveform selected at block 914 may comprise multiple peaks over the length of the waveform for a multisyllabic word.

If it is determined that the length of the word is greater than or equal to the second length threshold at block 912, the process 900 follows the "no" route from block 912 to block 916 where a third type of viseme is selected for the word. For example, a sine wave, such as a smooth curve waveform, type of viseme may be selected at block 916 such that, upon processing at the one or more accessory devices 104, a movable mouth and/or mouth animation of the one or more accessory devices 104 may open progressively wider and then shut progressively smaller until close over the course of the waveform. After a type of viseme is selected at block 910, 914, and/or 916 for a particular word in the phrase, a determination is made at block 918 as to whether there are more words in the phrase to be transformed into corresponding visemes. If there are more words in the phrase to be processed, the process 900 increments to the next word in the phrase at block 920 and iterates by returning to block 906 and proceeding through the process 900 for the next word.

When all or substantially all of the words in a particular phrase of the text data have been associated with visemes, the process 900 may follow the "no" route from block 918 to block 922 where a determination may be made as to whether there are more phrases to be processed in the text data. If there are more phrases to be processed, the process 900 may increment to the next phrase in the transcription at block 924 and iterates by returning to block 902 and proceeding through the process 900 for the next phrase. When all or substantially all of the phrases of the text data have been processed, the process 900 may end at block 926, and the series of visemes may be associated with the timestamp information of the text data.

In some embodiments, where a transcription of words is not utilized to generate viseme information, but instead, frequency data is used to generate viseme information, the length of a word can be determined from sequential frequency threshold crossings in frequency data obtained from the main audio content. For example, if frequency data rises above a predefined frequency threshold at time, $t_1$, and subsequently falls below the predefined frequency threshold at time, $t_2$, the length of the word in units of time can be determined based on the difference between time $t_2$ and time $t_1$. Thus, the process 900 can be modified to accommodate the use of frequency data instead of or in addition to text data in order to select particular visemes to associate with words having particular lengths in units of time.

Figure 10:
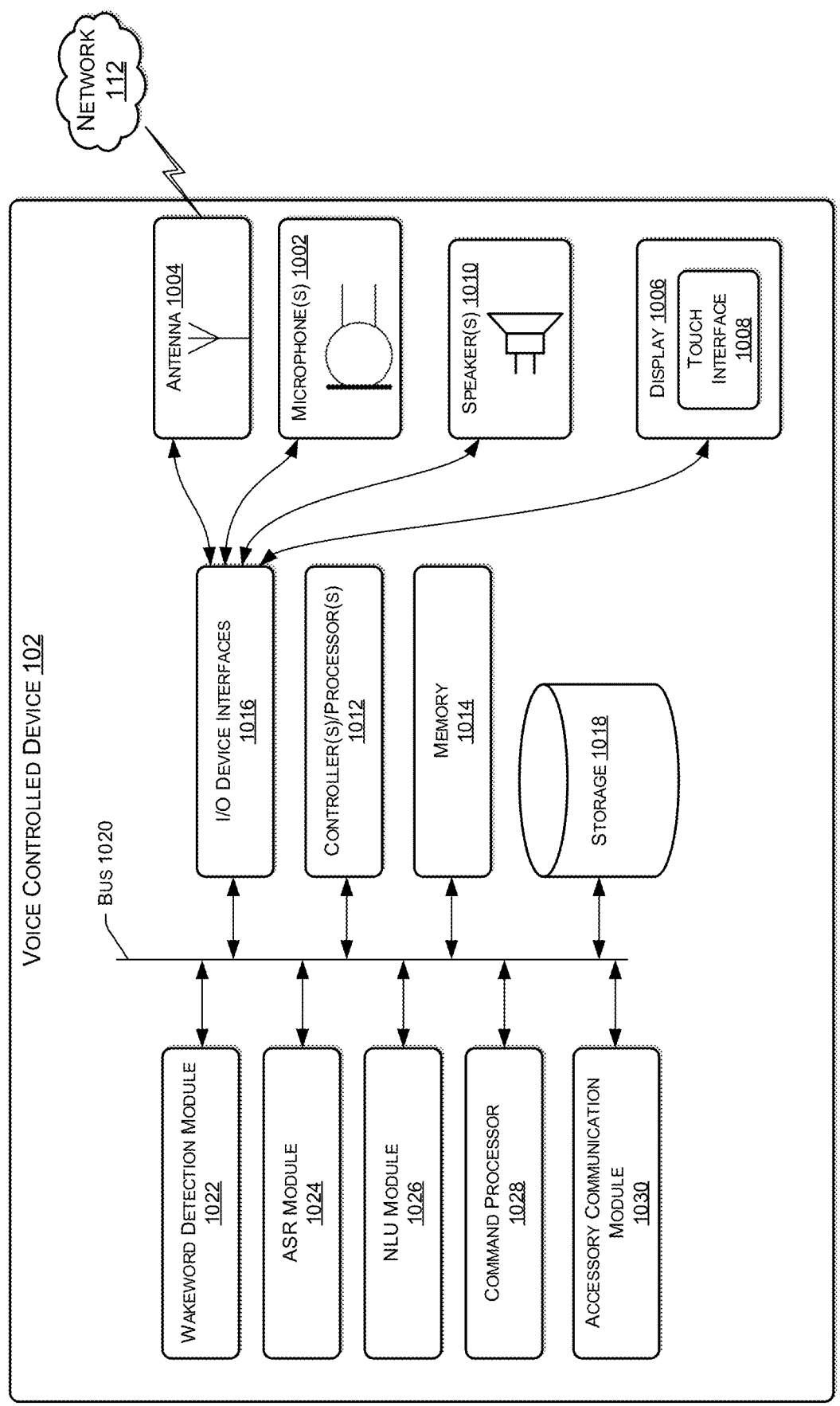
FIG. 10 illustrates a conceptual diagram of example components of a voice-controlled device.

FIG. 10 illustrates a conceptual diagram of example components of a voice-controlled device. FIG. 11 illustrates a conceptual diagram of example components of an accessory device to the voice-controlled device. In operation, each of these devices (or groups of devices) may include computer-readable and computer-executable instructions that reside on the devices 102 and 104, as will be discussed further below.

The voice-controlled device 102 may be implemented as a standalone device 102 that is relatively simple in terms of functional capabilities with limited input/output components, memory, and processing capabilities. For instance, the voice-controlled device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the voice-controlled device 102. Nonetheless, the primary, and potentially only mode, of user interaction with the device 102 is through voice input and audible output. In some instances, the device 102 may simply comprise a microphone 1002, a power source, and functionality for sending generated audio data via one or more antennas 1004 to another device.

The voice-controlled device 102 may also be implemented as a more sophisticated computing device, such as a computing device similar to, or the same as, a smart phone or personal digital assistant. The device 102 may include a display 1006 with a touch interface 1008 and various buttons for providing input as well as additional functionality such as the ability to send and receive communications. Alternative implementations of the voice-controlled device 102 may also include configurations as a personal computer. The personal computer may include a keyboard, a mouse, a display 1006, and other hardware or functionality that is found on a desktop, notebook, netbook, or other personal computing devices. In examples, the voice-controlled device 102 may include an automobile, such as a car, and the accessory device 104 may be disposed in the car and connected, via wired or wireless coupling, to the car. In other examples, the voice-controlled device 102 may include a pin on a user's clothes or a phone on a user's person, and the accessory device 104 may comprise an automobile, such as a car, that operates in coordination with the pin or phone, as described herein. In examples, the voice-controlled device 102 may include speaker(s) 1010. In other examples, the voice-controlled device 102 and may not include speaker(s) 1010 and may utilize speaker(s) of an external or peripheral device to output audio via the speaker(s) of the external/peripheral device. In this example, the voice-controlled device 102 might represent a set-top box (STB), and the device 102 may utilize speaker(s) of an accessory device 104 such as a television that is connected to the STB for output of audio via the external speakers. In other examples, the voice-controlled device 102 may not include the microphone(s) 1002, and instead, the voice-controlled device 102 can utilize microphone(s) of an external or peripheral device to capture audio and/or generate audio data. In this example, the voice-controlled device 102 may utilize microphone(s) of a headset that is coupled (wired or wirelessly) to the voice-controlled device 102. These types of devices are provided by way of example and are not intended to be limiting, as the techniques described in this disclosure may be used in essentially any device that has an ability to recognize speech input or other types of natural language input.

Each of these devices 102 and 104 of FIGS. 10 and 11 may include one or more controllers/processors 1012 and 1104, that may include a central processing unit (CPU) for processing data and computer-readable instructions, and memory 1014 and 1106 for storing data and instructions of the respective device 102 and 104. Each device 102 and 104 may also be connected to removable or external non-volatile memory and/or storage, such as a removable memory card, memory key drive, networked storage, etc., through respective input/output device interfaces 1016 and 1102.

Computer instructions for operating each device 102 and 104 and its various components may be executed by the respective device's controller(s)/processor(s) 1012 and 1104, using the memory 1014 and 1106 as temporary "working" storage at runtime. A device's computer instructions may be stored in a non-transitory manner in non-volatile memory 1014 and 1106, storage 1018 and 1108, or an external device(s). Alternatively, some or all of the executable instructions may be embedded in hardware or firmware on the respective device 102 and 104 in addition to or instead of software.

Each device 102 and 104 includes input/output device interfaces 1016 and 1102. A variety of components may be connected through the input/output device interfaces 1016 and 1102. Additionally, each device 102 and 104 may include an address/data bus 1020 and 1110 for conveying data among components of the respective device. Each component within a device 102 and 104 may also be directly connected to other components in addition to, or instead of, being connected to other components across the bus 1020 and 1110.

The devices 102 and 104 may each include a display 1006 and 1112, which may comprise a touch interface 1008 and 1114. Any suitable display technology, such as liquid crystal display (LCD), organic light emitting diode (OLED), electrophoretic, and so on, may be utilized for the displays 1006 and 1112. Furthermore, the processor(s) 1012 and 1104 may comprise graphics processors for driving animation and video output on the associated displays 1006 and 1112, or the device 102 and 104 may be "headless" and may primarily rely on spoken commands for input. As a way of indicating to a user that a connection between another device has been opened, the device 102 and 104 may be configured with one or more visual indicators, such as the light source(s) 1116 of the accessory device 104, which may be in the form of LED(s) or similar components (not illustrated), that may change color, flash, or otherwise provide visible light output, such as for a light show on the accessory device 104, or a notification indicator on the device 102 and 104. The input/output device interfaces 1016 and 1102 that connect to a variety of components such as an audio output component such as a speaker 1010 and 1118 for outputting audio (e.g., audio corresponding to audio content, a text-to-speech (TTS) response, etc.), a wired headset or a wireless headset or other component capable of outputting audio. A wired or a wireless audio and/or video port may allow for input/output of audio/video to/from the device 102 and 104. The device 102 and 104 may also include an audio capture component. The audio capture component may be, for example, a microphone 1002 and 1120 or array of microphones, a wired headset or a wireless headset, etc. The microphone 1002 and 1120 may be configured to capture audio. If an array of microphones is included, approximate distance to a sound's point of origin may be determined using acoustic localization based on time and amplitude differences between sounds captured by different microphones of the array. The device 102 (using microphone 1002, wakeword detection module 1022, ASR module 1024, etc.) may be configured to generate audio data corresponding to captured audio. The device 102 (using input/output device interfaces 1016, antenna 1004, etc.) may also be configured to transmit the audio data to the remote system 114 for further processing or to process the data using internal components such as a wakeword detection module 1022. In some configurations, the accessory device 104 may be similarly configured to generate and transmit audio data corresponding to audio detected by the microphone(s) 1120.

Via the antenna(s) 1004 and 1122, the input/output device interfaces 1016 and 1102 may connect to one or more networks 112 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the devices 102 and 104 via wired connection to an external alternating current (AC) outlet, and/or via onboard power sources, such as batteries, solar panels, etc.

Through the network(s) 112, the speech processing system may be distributed across a networked environment. Accordingly, the device 102 and/or the remote system 114 may include an ASR module 1024. The ASR module 1024 of device 102 may be of limited or extended capabilities. The ASR module 1024 may include language models stored in ASR model storage component, and an ASR module 1024 that performs automatic speech recognition. If limited speech recognition is included, the ASR module 1024 may be configured to identify a limited number of words, such as keywords detected by the device, whereas extended speech recognition may be configured to recognize a much larger range of words.

The device 102 and/or the remote system 114 may include a limited or extended NLU module 1026. The NLU module 1026 of device 102 may be of limited or extended capabilities. The NLU module 1026 may comprise a name entity recognition module, an intent classification module and/or other components. The NLU module 1026 may also include a stored knowledge base and/or entity library, or those storages may be separately located.

The device 102 and/or the remote system 114 may also include a command processor 1028 that is configured to execute commands/functions associated with a spoken command as described herein.

The device 102 may include a wakeword detection module 1022, which may be a separate component or may be included in an ASR module 1024. The wakeword detection module 1022 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 2:
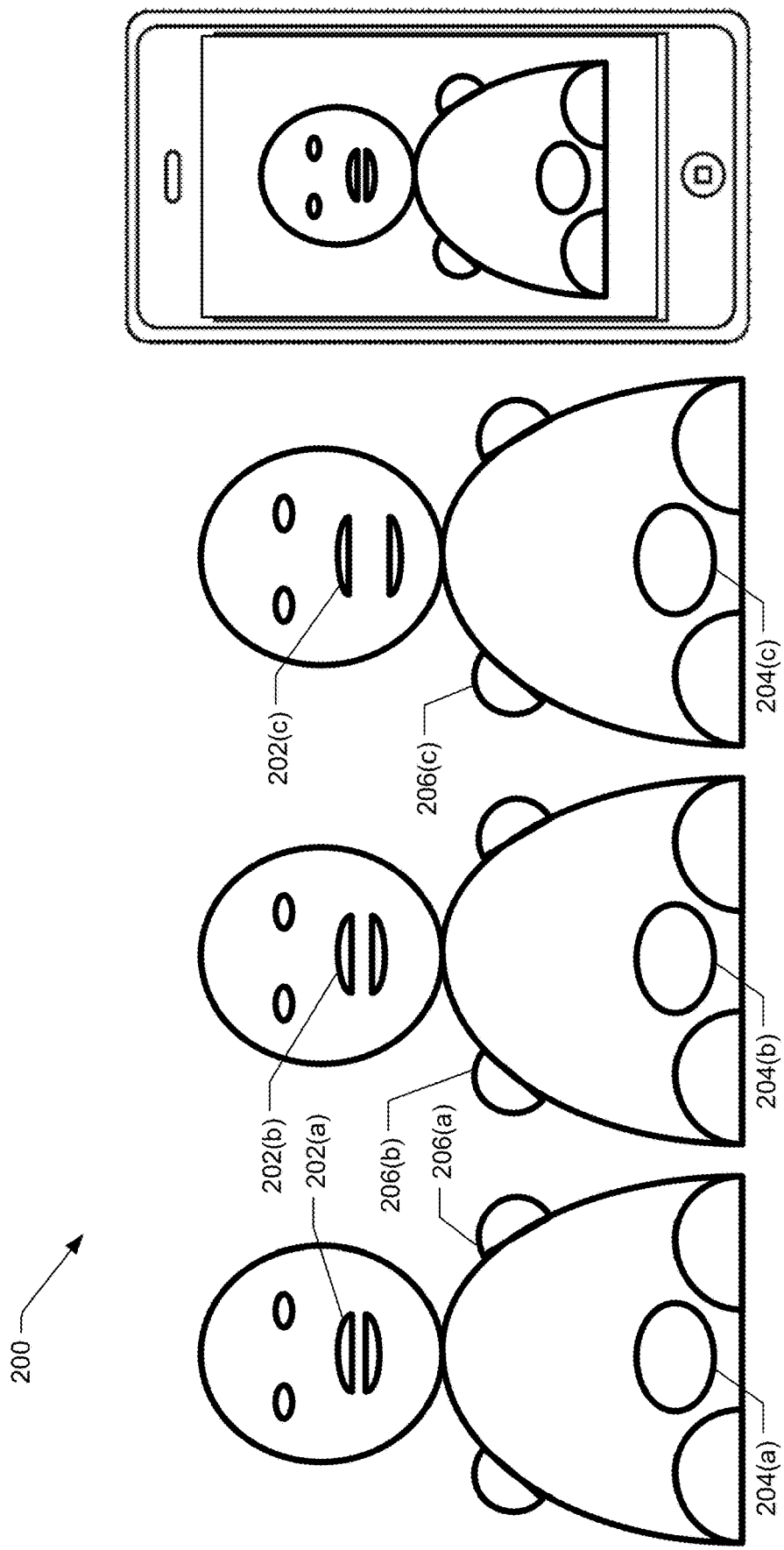
FIG. 2A illustrates an example device that may utilize viseme data to present visemes, such as a first viseme.
FIG. 2B illustrates the example device from FIG. 2A presenting a second viseme.
FIG. 2C illustrates the example device from FIG. 2A presenting a third viseme.
FIG. 2D illustrates an example device including a display depicting a digital rendering to present visemes.

With reference again to the accessory device 104 of FIG. 11, the accessory device 104 may include a housing, which is shown in FIGS. 1 and 2. The shape of the housing may be, for example, a sphere, a cube, a pyramid, a cone, or any suitable three-dimensional shape. In examples, the housing of the accessory device 104 may have a "life-like" form or shape, such as an animatronic toy, that is shaped like an animal, an android, or the like. Accordingly, the accessory device 104 may include movable or actuating (e.g., pivoting, translating, rotating, etc.) members (e.g., a movable mouth, arms, legs, tail, eyes, ears, etc.) that operate in accordance with control signals received from the voice-controlled device 102. The accessory device 104 may include one or multiple motors 1124 for use in actuating such movable members. In this sense, the accessory device 104 may be "brought to life" by the user issuing voice commands to the voice-controlled device 102, and the voice-controlled device 102 responding by controlling the operation of the accessory device's 104 various components.

The accessory device 104 may be configured (e.g., with computer-executable instructions stored in the memory 1106) to select, or toggle, between multiple available modes based on commands (or instructions) received from the remote system 114 (in some cases, via the voice-controlled device 102), or based on user input received at the accessory device 104 itself. For example, the user can ask the voice-controlled device 102 to set the accessory device 104 in a particular mode of operation, such as a lip synch mode, a dance mode, a game play mode, etc., among multiple available modes of operation, and the accessory device 104 may select the particular mode to cause various components, such as the light source(s) 1116, the display 1112, etc.) to operate in a particular manner based on the selected mode of operation. Additionally, the accessory device 104 may select a mode of operation based on a current "mood" (e.g., happy, sad, etc.) of the accessory device 104, which the accessory device 104 may receive from the remote system 114 directly or via the device 102, or the accessory device 104 may change "moods" among multiple available moods based on internal logic. Available modes of operation for selection can include, without limitation, a setup mode, a dance mode, a lip synch mode, a play mode, a game mode, an emoji mode, an offline mode, a message mode, and so on.

A dance mode may be initiated by the user uttering the command "Tell Accessory_Device to dance to music by Artist_Name," and the dance mode may cause the accessory device 104 to operate in a particular manner, such as by operating an embedded display 1112 to present an animation of a dancing figure or character that is synchronized with the beat signature, such as dancing to the beat, of music that is playing via the accessory device 104 and/or via the voice-controlled device 102, by activating individual lights 1116 or particular groups of lights 1116 in accordance with the beat signature of the music, or by actuating one or more movable members, such as arms, hips, legs, tail, etc., of the accessory device 104 to move in a synchronized manner with the beat signature of the music. When there are multiple accessories devices 102, the group of accessory devices 104 may dance together in dance mode. In addition, the accessory device 104 in dance mode can cause one or more of the light sources 1116, which may be multi-color, to operate in coordination with the beat signature of the music. It is to be appreciated that the housing of the accessory device 104 may include a substantially translucent or transparent outer body so that the display 1112 and the light sources 1116 may be embedded in the housing and behind the translucent outer body to emit light through the body so that the light may be seen by the user. In addition, at least some of the motors 1124 may act as vibration components that cause the accessory device 104 housing to vibrate. Other vibration mechanisms, such as piezoelectric elements and the like may be used for vibration purposes, or to otherwise provide haptic sensation to a user holding the accessory device 104.

Lip sync mode may be initiated by the user uttering, for example, "Tell Accessory_Device to sing to music by Artist_Name," and the lip sync mode may cause the accessory device 104 to operate in a particular manner, such as by operating an embedded display 1112 to present a mouth-related animation, such as an animation of a face or lips that is synchronized with the words or lyrics of music that is playing via the accessory device 104 and/or via the voice-controlled device 102, or by actuating one or more movable members, such as a mouth, a lower jaw portion of a mouth, etc., of the accessory device 104 to move in a synchronized manner with the words or voices heard in the audio of the music. When there are multiple accessory devices 104, the group of accessory devices 104 can sing together in lip sync mode.

The play mode and/or game mode may have various sub-modes, such as joke mode, story mode, fortune teller mode, trapped in the ball mode, or game mode with various games like trivia, tic-tac toe, rock-paper-scissors, and so on. Whenever the play mode involves outputting a TTS response via the accessory device 104, such as when the accessory device 104 tells a joke, a story, a fortune, or otherwise, the accessory device 104 may display an animation of a face or lips, or an animation of an entire character, on the display 1112 of the accessory device 104 that "mouths" the words being output as audio via the accessory device 104 or the voice-controlled device 102. Additionally, or alternatively, the accessory device 104 can actuate a movable member, such as a mouth, a lower jaw of a mouth, etc., to provide an animatronic movement that is synchronized with the words being output as audio via the TTS output. Customized voices may be selected by the user to provide a unique voice for each accessory device 104 when the accessory device 104 outputs TTS responses via its own speaker(s) 1118 or the speaker 1010 of the device 102. In some embodiments, the voice-controlled device 102 and/or the accessory device 104 may be configured with voice-recognition capabilities to recognize a user's voice and to respond using the name of the user. For example, unique speaker identification logic can be stored in the memory 1106 of the accessory device 104, and/or in the memory 1014 of the device 102, so that members of a household can set their own customizable options, and watch the accessory device 104 transform based on which speaker is invoking operation of the accessory device 104. Additionally, or alternatively, child-tuned ASR can be used by the device 102 and/or remote system 114 to recognize children's voices for better understanding and processing of speech commands from children. Pre-recorded audio can be stored in the memory 1014 and 1106 of the device 102 and 104, or received from another source by the device 102 and 104, to deliver proper tone and intonation for more expressive interactions.

A camera 1126 can be mounted on the accessory device 104 and utilized for purposes like facial recognition and determining the presence or absence of a user in the vicinity of the accessory device 104 based on movement detection algorithms, etc. The camera 1126 may also be used for locating the user when the user emits an audio utterance in the vicinity of the accessory device 104. Alternative methods, such as echo-location and triangulation approaches, can also be used to locate the user in the room.

The accessory device 104 may include additional sensors 1128 for various purposes, such as accelerometers for movement detection, temperature sensors (e.g., to issue warnings/notifications to users in the vicinity of the accessory, and other types of sensors 1128. A global positioning sensor (GPS) 1130 may be utilized for location determination of the accessory device 104.

Offline mode may cause the accessory device 104 to operate according to a subset of operations, such as a subset of jokes, stories, songs, etc., stored in local memory of the accessory device 104. This may be useful in situations where the accessory device 104 is not connected to a network, such as a WiFi network, such as if the user takes the accessory device 104 on a road trip and the accessory device 104 is outside of an available network coverage areas. A push button on the housing of the accessory device 104, or a soft button on a touch screen of the display 1112, may allow for the user to easily engage the offline mode of the accessory device 104, such as when the voice-controlled device 102 is unavailable or powered off.

The setup mode may allow the user to configure the accessory device 104, and the accessory device 104 may demonstrate various ones of the available modes of operation during the setup mode. Set-up of the accessory device 104 may be substantially "low-friction" in the sense that it is not overly complicated and does not require that the user interact with the accessory device 104 at all, other than powering the accessory device 104 on, thereby allowing the user to enjoy the accessory device 104 quickly upon purchase. A companion application can be installed on a mobile device of the user to interface with the accessory device 104, such as to set-up the accessory. Such a companion application on a mobile device of the user can also be used for messaging mode of the accessory device 104, such as to send a message that is output, such as, displayed, output via audio on speakers, etc., of the accessory device 104. For instance, a parent, guardian, or friend connected to the same account of the user may send message data via the companion application to be output through the output means of the accessory device 104. Upon receipt of message data, the accessory device 104 may provide a notification of the received message, such as activation of a light source(s) 1116, presenting a message icon on the display 1112, etc., and may wait to playback the message data until the user requests playback of the message, such as via a voice command. Content may be updated at multiple different times, such as periodically, in response to a trigger event, etc., on the accessory device 104 via the wireless interface of the accessory device 104. In examples, parental consent may be enabled for the accessory device 104 to restrict the accessory device 104 from performing particular operations when a minor or child is detected via unique voice identification. The user may customize colors of the light sources 1116, voices for TTS output via the accessory device 104, and other customizable features in the setup mode.

The memory 1106 of the accessory device 104 may store computer-executable instructions that, when executed by the controller(s)/processor(s) 1104, cause the accessory device 104 to discover other accessory devices 104 registered to the user. The accessory device 104 may be configured to publish an identifier, such as an IP address, for this purpose that is sent to the remote system 114, and each accessory may receive identifiers of all other accessories registered to the user from the remote system 114. In this manner, accessory devices 104 may recognize each other and perform in a synchronized or meaningful way. Any suitable network protocol, such as UPnP, may be utilized to connect devices in this manner. Devices can also communicate using high frequency, such as a frequency inaudible to humans, tones and a modulator-demodulator algorithm to transmit data over audio. Accessory devices 104 can "banter" back and forth, such as by outputting audio, which is received by the voice-controlled device 102 and processed in a similar manner to audio detected as coming from the user, and thereafter, sending control signals to an appropriate accessory device 104 that is to respond to another accessory device 104.

Computer-executable instructions may be stored in the memory 1106 of the accessory device 104 that, when executed by the controller(s)/processor(s) 1104, cause various components of the accessory device 104 to operate in a synchronized manner (i.e., in coordination) with audio output via speakers of the voice-controlled device 102 and/or via speakers of the accessory device 104. For example, accessory device 104 may be configured to process control information that it receives from the remote system 114, possibly routed through the device 102, and which is associated with an audio file or other TTS data that is to be output as synthesized speech output. In this manner, the accessory device 104 may display digital animations on the display 1112, operate the light sources 1116, and/or actuate movable members of the accessory device 104 in synchronization with the audio corresponding to, for example, an audio file, TTS response, etc. Accordingly, the accessory device 104 may receive the control information, possibly along with the associated audio data. The control information can include, without limitation, viseme information and/or dance information.

For time synchronization, the accessory device 104 may include a clock 1132 that may be referenced and correlated with clocks of other devices, such as other accessory device 104, voice-controlled devices 102, etc., via offset and skew parameters to allow the accessory device 104 to maintain synchronization with other accessory devices 104 and/or with the device 102, such as when a group of accessory devices 104 "dances" to the same song, or when the accessory device 104 is to operate in a synchronized manner with audio output by the device 102. For instance, the device 102 may utilize an accessory communication module 1030 to send time synchronization information, such as timestamps, to the accessory device 104, and the accessory device 104 may return time synchronization information to the device 102, which may be used to calculate offset and skew parameters so that respective clocks of the devices 102 and 104 (or clocks of multiple accessory devices 104) can be synchronized so that operation of the accessory device 104 and the device 102 can be synchronized. The clock 1132 may also be used as a timer that, when expired, can emit a character specific sound to act as an alarm clock, a kitchen timer, etc. The accessory communication module 1030 may further be utilized by the device 102 to communicate any suitable information and data to the accessory device 104, such as the forwarding of a second instruction and second information, and/or forwarding of control information and/or supplemental content to the accessory device 104, such as when the device 102 acts as a pass-through device that obtains information from the remote system 114 and sends the information to the accessory device 104. In examples, when the user device 102 sends instructions to present visemes to the accessory device 104, the instructions may be sent via the data layer, and in some examples the serial port profile, of the Bluetooth protocol.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
    one or more processors; and
    computer-readable media storing computer-executable instructions that, when executed by the one or more processors, cause the one or more processors to perform operations comprising:
        generating, in an uncompressed format, audio data corresponding to a song, the audio data representing frequencies and amplitudes of the song;
        analyzing the audio data to determine a number of beats per minute associated with the audio data;
        determining, using a Viterbi algorithm and the beats per minute, a portion of the audio data representing human sound;
        determining viseme data to associate with the audio data, the viseme data determined from an amplitude of the amplitudes;
        generating lip-sync data including the viseme data and the audio data; and
        sending the lip-sync data to a first device, the lip-sync data causing the first device to output the audio data and causing a second device to present the viseme data while the audio data is output.

2. The system of claim 1, wherein determining the viseme data to associate with the audio data comprises:
    determining that a first amplitude associated with a first portion of the audio data is within a first amplitude range;
    determining that a second amplitude associated with a second portion of the audio data is within a second amplitude range, the first amplitude range being greater than the second amplitude range;
    associating a first viseme with the first portion of the audio data based on the first amplitude being within the first amplitude range; and
    associating a second viseme with the second portion of the audio data based on the second amplitude being within the second amplitude range, the second viseme corresponding to a mouth position that is more closed than the first viseme.

3. The system of claim 1, the operations further comprising:
    identifying contextual information associated with the song, the contextual information including at least one of an artist associated with the song or a genre associated with the song;

determining an audio frequency range of speech associated with the contextual information; and wherein determining the portion of the audio data corresponding to the human sound comprises determining the portion of the audio data corresponding to the human sound based at least in part on the audio frequency range.

4. The system of claim 1, wherein a first portion of the audio data corresponds to the song and a second portion of the audio data corresponds to text-to-speech audio data, and the operations further comprising:

associating the first portion of the audio data with the second portion of the audio data;

causing the second device to output audio corresponding to the text-to-speech audio data; and causing the first device to output audio corresponding to the song.

5. A method, comprising:

determining a portion of audio data representing human sound;

determining amplitude data corresponding to one or more amplitudes of the portion of the audio data;

determining viseme identifiers to associate with the audio data, the viseme identifiers determined based at least in part on the amplitude data;

generating viseme data that associates the viseme identifiers and portions of the audio data corresponding to the viseme identifiers;

generating at least one command associated with the viseme data, the at least one command configured to, when sent to a first device:

cause, by a first processor of the first device, the first device to output the audio data, the first device being a voice-controlled device including a voice user interface; and cause, by a second processor of a second device corresponding to a different device than the first device, the second device to present a visual representation of the viseme identifiers while the audio data is output; and sending the viseme data, the audio data, and the at least one command to the first device.

6. The method of claim 5, wherein the audio data corresponds to a song, and further comprising:

identifying contextual information associated with the song, the contextual information including at least one of an artist associated with the song or a genre associated with the song;

determining an audio frequency range of human sound associated with the contextual information; and wherein determining the portion of the audio data representing the human sound comprises determining the portion of the audio data representing the human sound based at least in part on the audio frequency range.

7. The method of claim 5, further comprising:

analyzing the audio data to determine a number of beats per minute associated with the audio data; and determining, based at least in part on a Viterbi algorithm and the number of beats per minute, the portion of the audio data representing the human sound.

8. The method of claim 5, wherein the second device is an animatronic device, and sending the viseme data and the at least one command causes a face portion of the animatronic device to physically move mouth positions based at least in part on the viseme data.

9. The method of claim 5, further comprising:

identifying a portion of the audio data corresponding to a frequency that is outside of a range of frequencies corresponding to human sound; and wherein determining the portion of the audio data representing the human sound comprises determining the portion of the audio data representing the human sound based at least in part on excluding the portion outside of the range of frequencies.

10. The method of claim 5, further comprising:

determining that a first amplitude associated with a first portion of the audio data is within a first amplitude range;

determining that a second amplitude associated with a second portion of the audio data is within a second amplitude range, the first amplitude range being greater than the second amplitude range;

associating a first viseme identifier of the viseme identifiers with the first portion of the audio data based at least in part on the first amplitude being within the first amplitude range; and associating a second viseme identifier of the viseme identifiers with the second portion of the audio data based at least in part on the second amplitude being within the second amplitude range, the second viseme identifier corresponding to a mouth position that is more closed than the first viseme identifier.

11. The method of claim 5, wherein the audio data comprises speech-based first audio data, and further comprising:

receiving, from the first device, second audio data representing a request for the first device to output a speech-based response;

identifying a word corresponding to the speech-based response;

determining at least one of the viseme identifiers to associate with the word;

causing the first device to output audio corresponding to the speech-based response; and causing the second device to present a visual representation of the at least one of the viseme identifiers during output of the audio.

12. The method of claim 5, further comprising:

generating text data based at least in part on automatic speech recognition performed on the portion of the audio data corresponding to the human sound, the text data indicating words corresponding to the human sound; and wherein determining the viseme identifiers to associate with the audio data comprises determining the viseme identifiers to associate with the audio data based at least in part on the text data.

13. The method of claim 5, further comprising analyzing, based at least in part on a Viterbi algorithm, the audio data at least until the portion of the audio data representing the human sound is determined at a threshold confidence level.

14. The method of claim 5, wherein determining the portion of the audio data representing the human sound comprises determining the portion of the audio data representing the human sound based at least in part on a Viterbi algorithm, and further comprising:

receiving feedback data indicating an accuracy of the viseme data; and generating a modified Viterbi algorithm based at least in part on the feedback data and the Viterbi algorithm.

15. A system, comprising:
one or more processors; and
computer-readable media storing computer-executable instructions that, when executed by the one or more processors, cause the one or more processors to perform operations comprising:
  receiving, at a first device and from a remote system, audio data;
  receiving, at the first device and from the remote system, viseme data indicating visemes associated with the audio data;
  receiving, at the first device and from the remote system, at least one command associated with the viseme data, the at least one command configured to cause a second device to present a visual representation of the viseme data while audio representing the audio data is output;
  determining that
    the second device is in communication with the first device; and
  causing the second device, via a first processor of the second device, to present a visual representation of the viseme data while a second processor of the first device causes the first device to output audio representing the audio data.

16. The system of claim 15, wherein the second device comprises an animatronic device that includes a mouth portion, and causing the second device to present the visual representation of the viseme data comprises causing the mouth portion to present the viseme data.

17. The system of claim 15, wherein the second device includes a display, and causing the second device to present the visual representation of the viseme data comprises causing animation of mouth movements corresponding to the visemes on the display.

18. The system of claim 15, wherein the viseme data includes timing data indicating which portions of the audio data are associated with the viseme data.

19. The system of claim 15, the operations further comprising:
  determining an identity of a user in proximity to the first device;
  identifying a user profile associated with the user;
  determining that the user profile indicates that the user is hearing impaired; and
  wherein causing the second device to present the visual representation of the viseme data comprises causing the second device to present the visual representation of the viseme data based at least in part on the user profile indicating that the user is hearing impaired.

20. The system of claim 15, wherein the audio data corresponds to a song, and the operations further comprising:
  receiving beat data indicating a number of beats per minute associated with the song; and
  causing presentation of a visual representation of the song based at least in part on the number of beats per minute.

* * * * *